United States Patent
Yokoyama

(10) Patent No.: US 12,092,520 B2
(45) Date of Patent: Sep. 17, 2024

(54) BROADBAND PULSED LIGHT SOURCE APPARATUS

(71) Applicant: Ushio Denki Kabushiki Kaisha, Tokyo (JP)

(72) Inventor: Takuma Yokoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 199 days.

(21) Appl. No.: 17/598,731

(22) PCT Filed: Mar. 25, 2020

(86) PCT No.: PCT/JP2020/013501
§ 371 (c)(1),
(2) Date: Sep. 27, 2021

(87) PCT Pub. No.: WO2020/196692
PCT Pub. Date: Oct. 1, 2020

(65) Prior Publication Data
US 2022/0187126 A1   Jun. 16, 2022

(30) Foreign Application Priority Data

Mar. 27, 2019 (JP) ................... 2019-062009
Mar. 27, 2019 (JP) ................... 2019-062010

(51) Int. Cl.
*G01J 3/10* (2006.01)
*G01N 21/27* (2006.01)
(Continued)

(52) U.S. Cl.
CPC ................ *G01J 3/10* (2013.01); *G01N 21/27* (2013.01); *G02B 27/0905* (2013.01);
(Continued)

(58) Field of Classification Search
CPC .......... G01J 3/10; G01J 3/0205; G01J 3/0218; G01J 3/42; G01N 21/27; G01N 2201/061;
(Continued)

(56) References Cited

U.S. PATENT DOCUMENTS

2006/0210269 A1   9/2006   Farhadiroushan et al.
2015/0023628 A1*  1/2015   Fermann ........... H01S 3/094046
                                                          385/5
(Continued)

FOREIGN PATENT DOCUMENTS

JP    H0915661 A      1/1997
JP    2003279480 A   10/2003
(Continued)

OTHER PUBLICATIONS

JP2003338650A translation (Year: 2003).*
(Continued)

*Primary Examiner* — Dominic J Bologna
*Assistant Examiner* — Akbar H. Rizvi
(74) *Attorney, Agent, or Firm* — Buchanan Ingersoll & Rooney PC

(57) ABSTRACT

Broadband pulsed light from a broadband pulsed light source is pulse-stretched such that an elapsed time and a wavelength in a pulse correspond to each other on a one-to-one basis, and is radiated to an object. The light transmitted through the object is received by a light receiver and converted into a spectrum by a calculator. The broadband pulsed light is divided according to a wavelength by dividing elements, and is pulse-stretched by two fibers having different dispersion characteristics or received by two light receivers having different characteristics.

9 Claims, 25 Drawing Sheets

(51) Int. Cl.
  *G02B 27/09* (2006.01)
  *G02B 27/10* (2006.01)
(52) U.S. Cl.
  CPC ... *G02B 27/1013* (2013.01); *G01N 2201/061* (2013.01); *G01N 2201/068* (2013.01); *G01N 2201/08* (2013.01)
(58) Field of Classification Search
  CPC ......... G01N 2201/068; G01N 2201/08; G02B 27/0905; G02B 27/1013; G02F 1/365
  See application file for complete search history.

(56) References Cited

U.S. PATENT DOCUMENTS

| | | | |
|---|---|---|---|
| 2017/0122806 A1* | 5/2017 | Capelle | H01S 3/08086 |
| 2018/0045571 A1* | 2/2018 | Shiozawa | G01N 21/65 |
| 2018/0202923 A1* | 7/2018 | Kageyama | G01N 21/39 |
| 2018/0299364 A1 | 10/2018 | Goda et al. | |
| 2018/0348119 A1* | 12/2018 | Hwang | G01N 21/49 |
| 2019/0008388 A1* | 1/2019 | Ando | G01J 3/00 |
| 2020/0166406 A1 | 5/2020 | Ota et al. | |

FOREIGN PATENT DOCUMENTS

| | | | | |
|---|---|---|---|---|
| JP | 2003338650 A | * | 11/2003 | ......... H01S 3/06754 |
| JP | 2006517677 A | | 7/2006 | |
| JP | 2013205390 A | | 10/2013 | |
| WO | 2017014097 A1 | | 1/2017 | |
| WO | 2017065257 A1 | | 4/2017 | |
| WO | WO-2018213286 A1 | * | 11/2018 | ................ G01J 3/10 |
| WO | WO-2018225799 A1 | * | 12/2018 | ............... G01J 3/433 |

OTHER PUBLICATIONS

International Search Report (PCT/ISA/210) and Written Opinion (PCT/ISA/237) with translations mailed on Jun. 23, 2020, by the Japan Patent Office as the International Searching Authority for International Application No. PCT/JP2020/013501.

* cited by examiner

FIG. 5 (1)
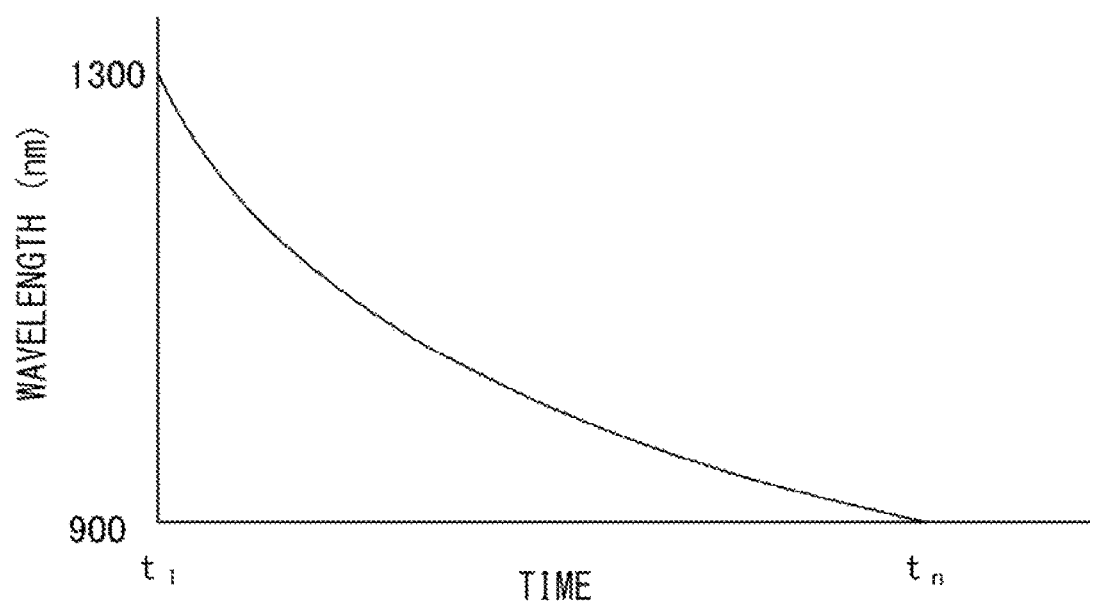
FIG. 5 (2)
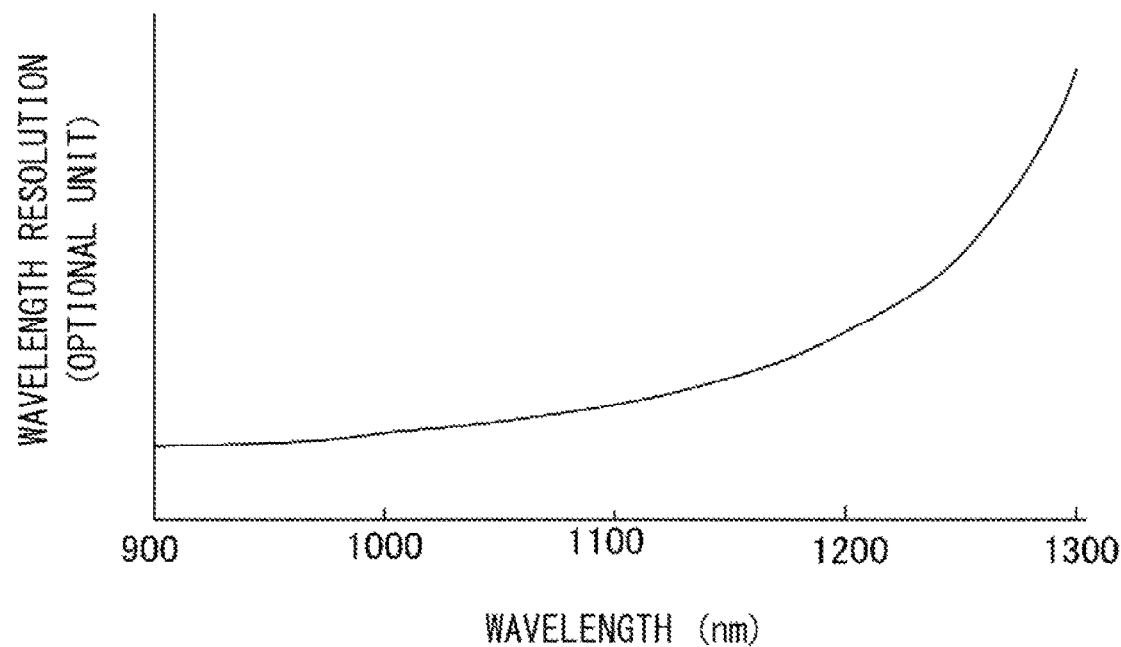

FIG. 6 (1)
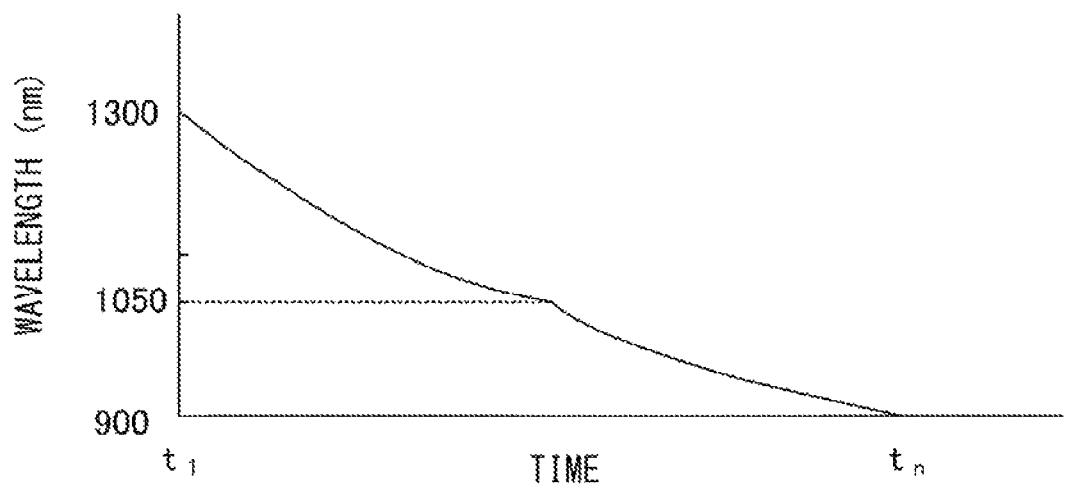
FIG. 6 (2)
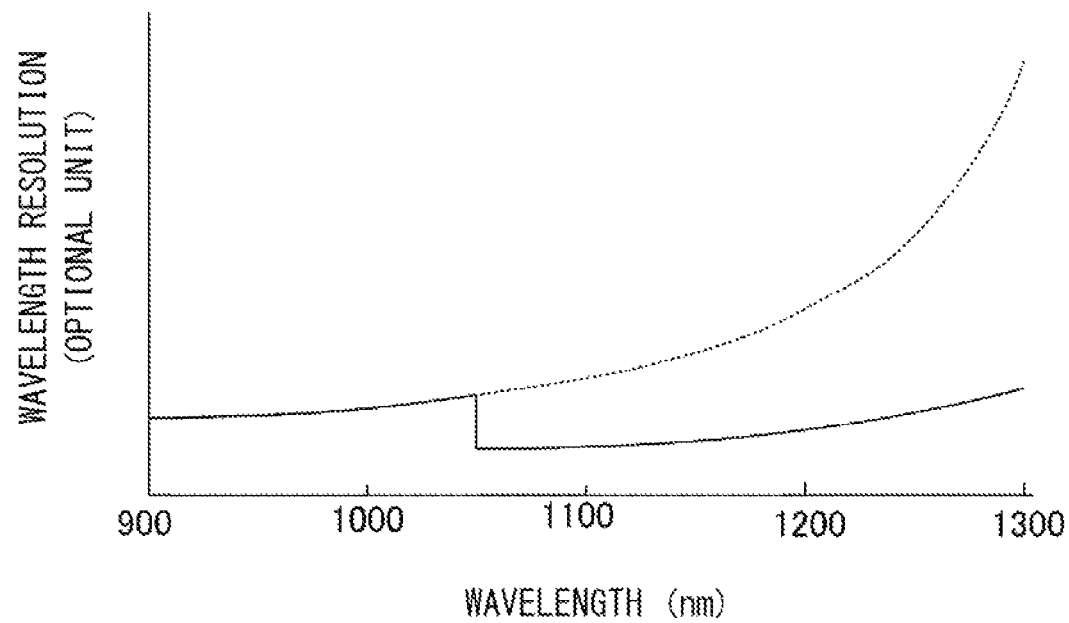

FIG. 7 (1)
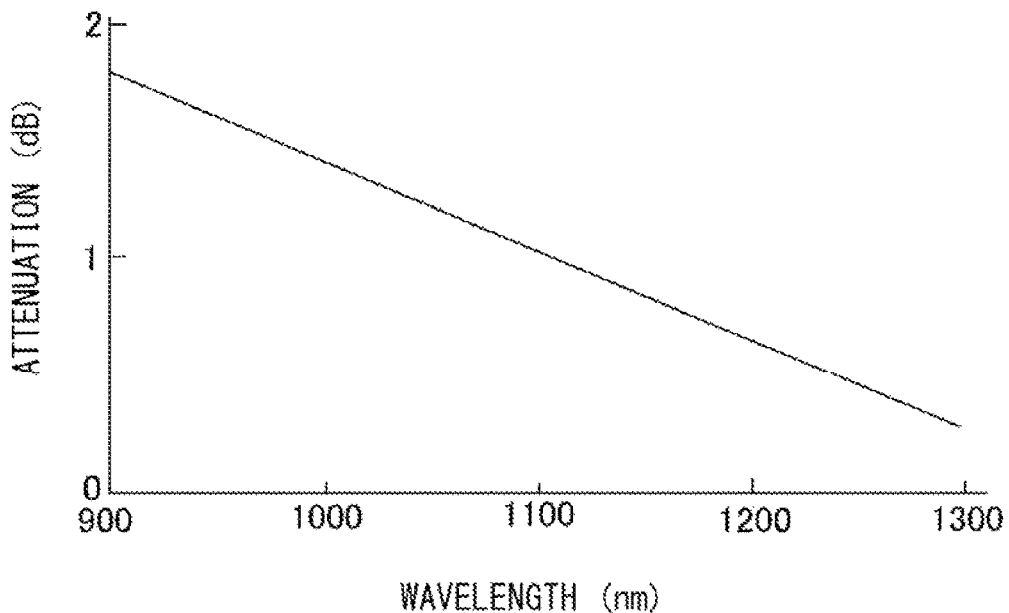
FIG. 7 (2)
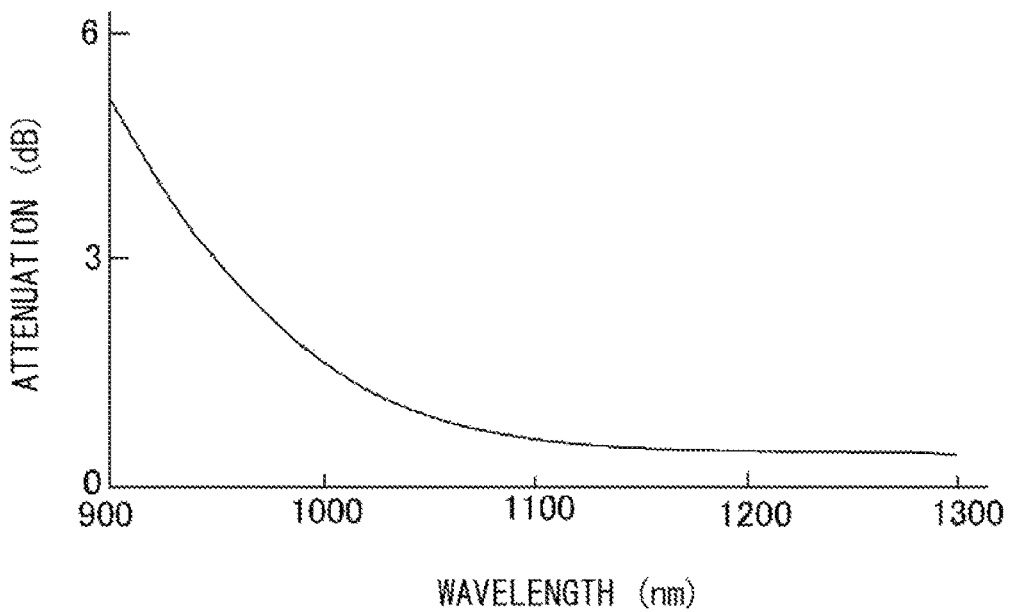

FIG. 8 (1)
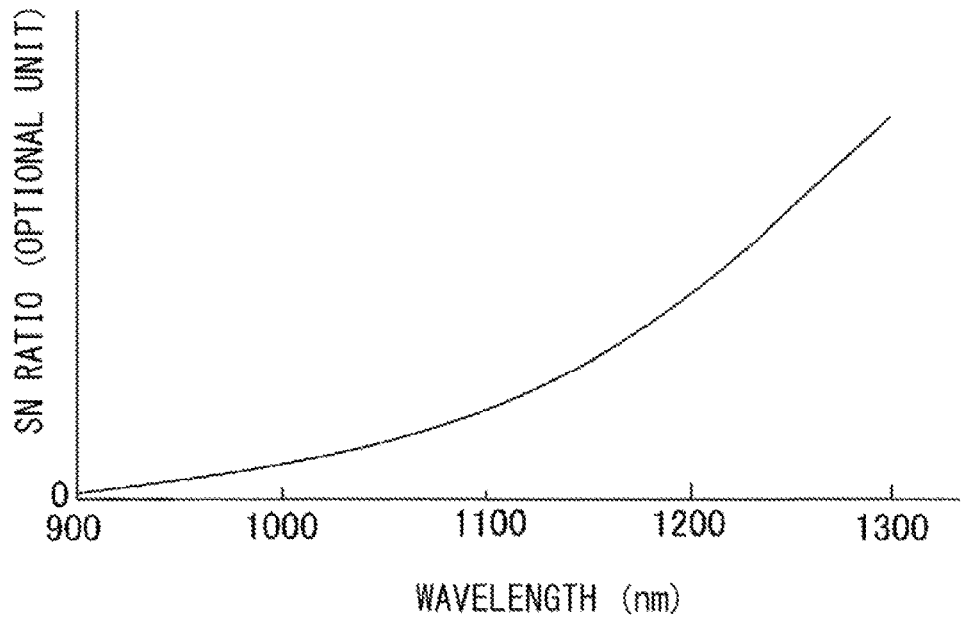
FIG. 8 (2)
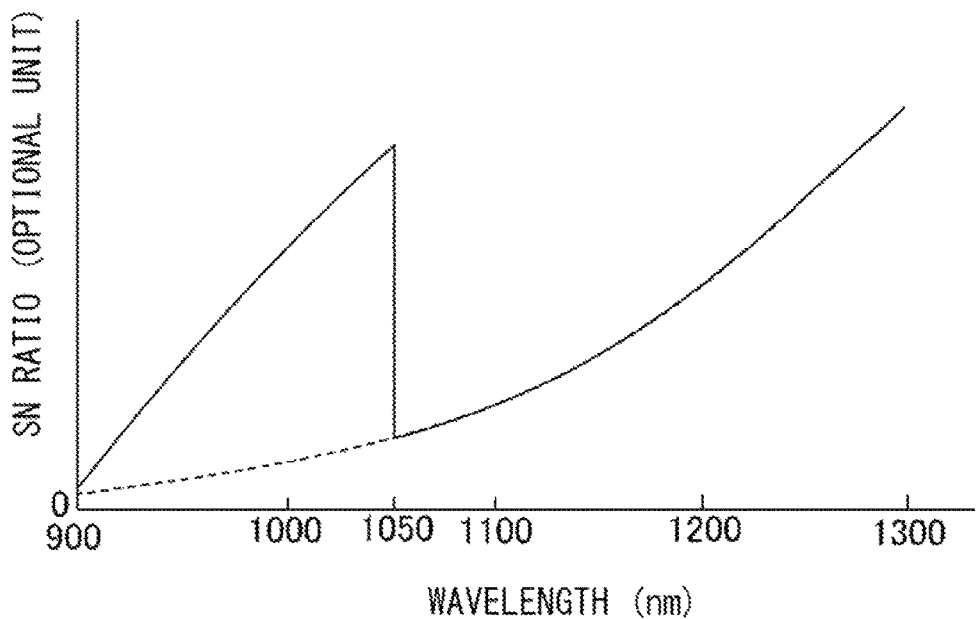

FIG. 9 (1)
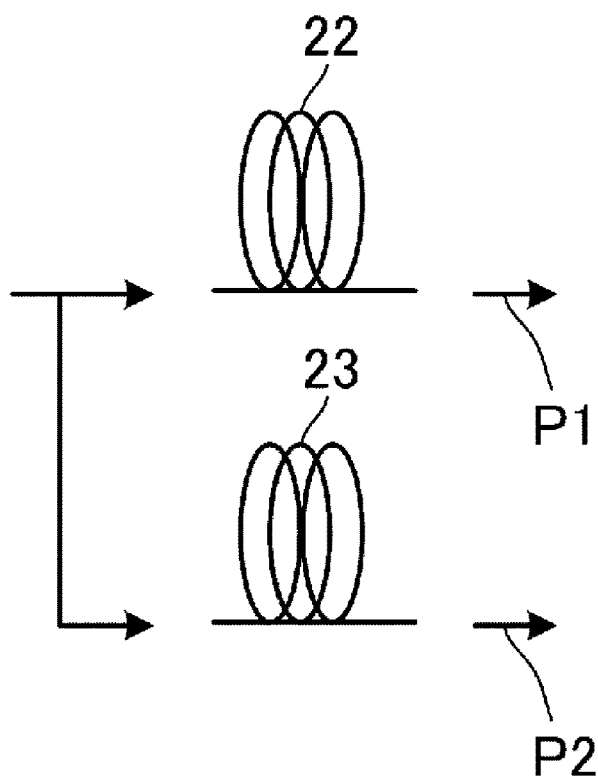
FIG. 9 (2)
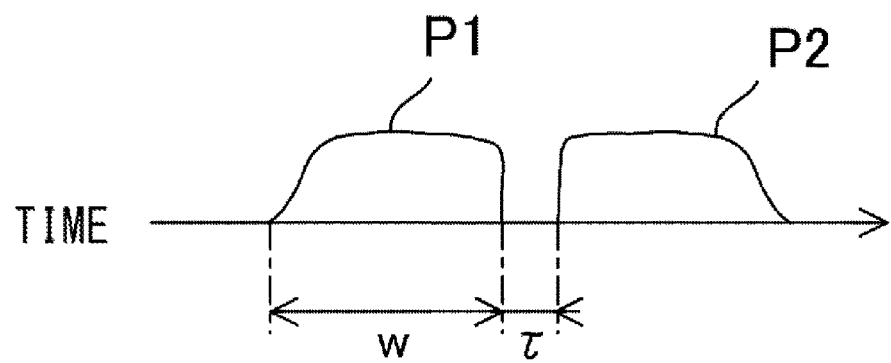

FIG. 11

| INTRA-PULSE TIME | WAVELENGTH | REFERENCE SPECTRUM DATA | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| ... | ... | ... | ... | ... |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

FIG. 22 (1)
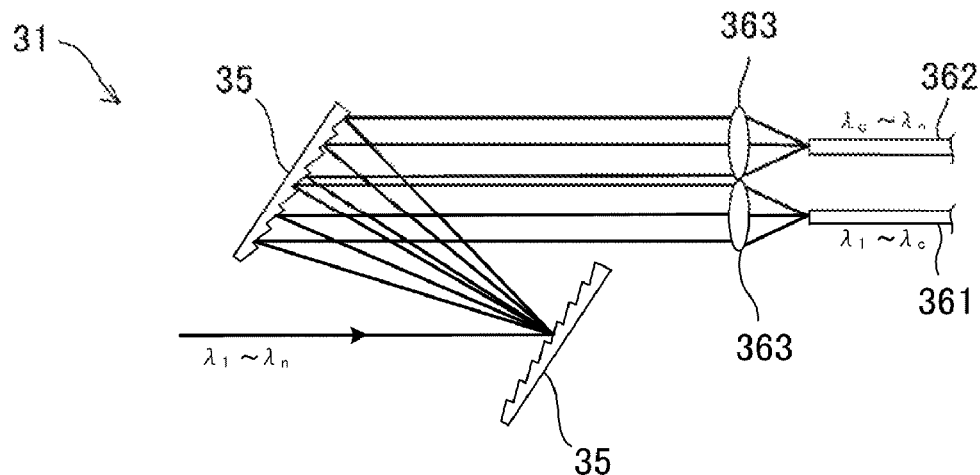
FIG. 22 (2)
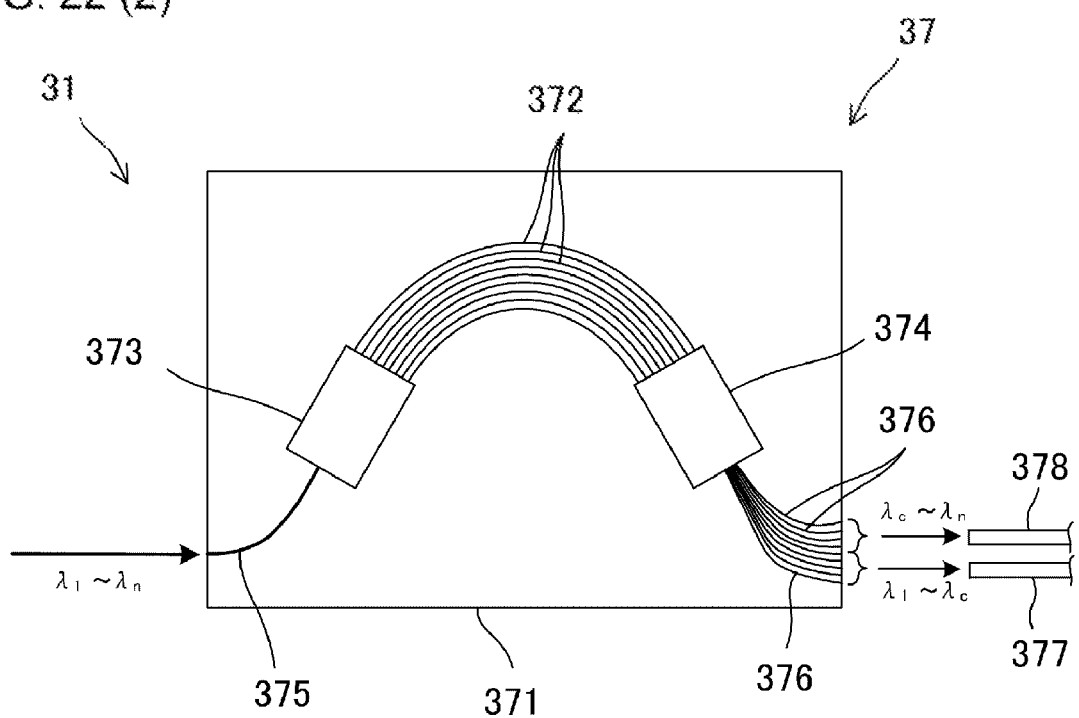

FIG. 26 (1)
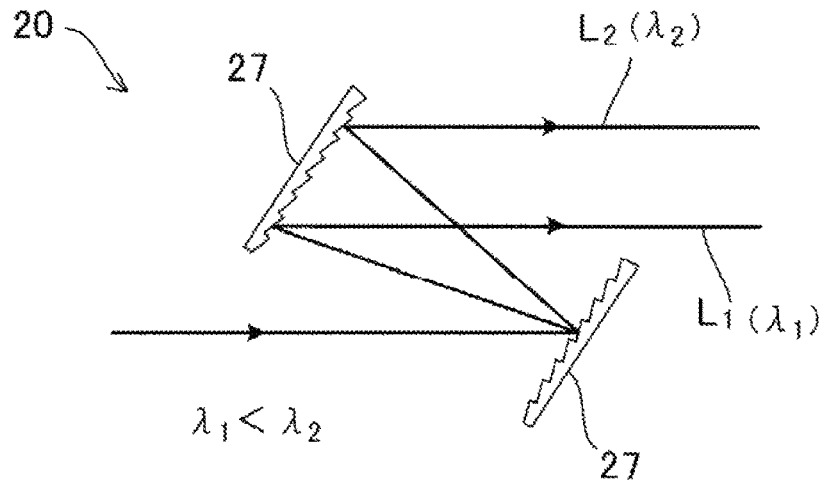
FIG. 26 (2)
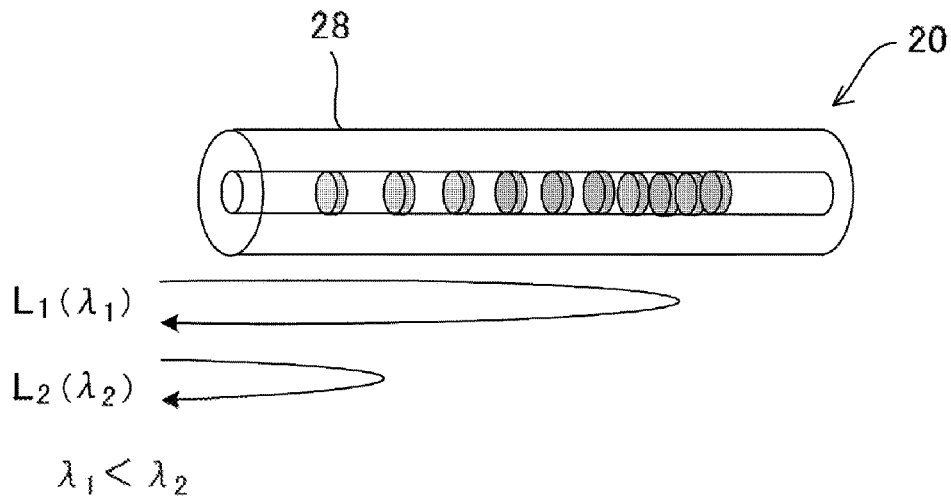
FIG. 26 (3)
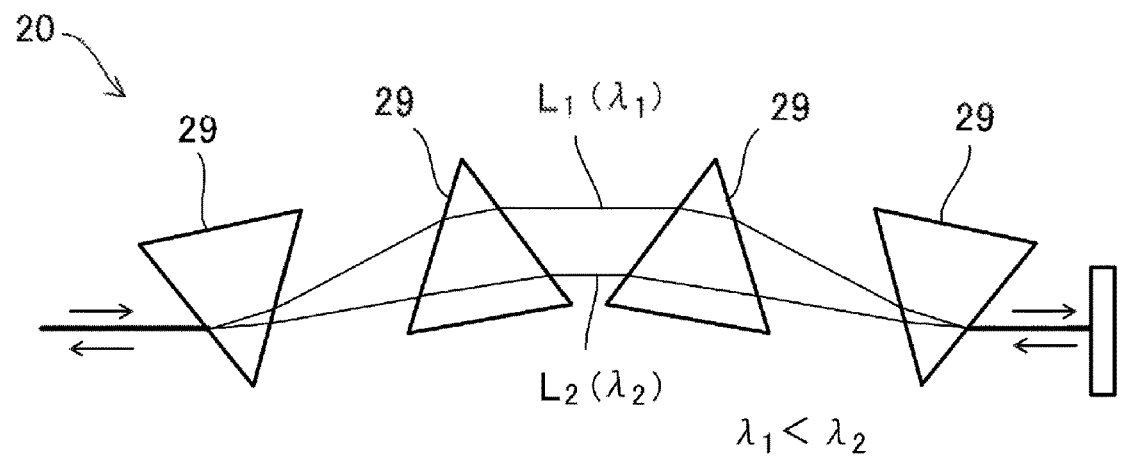

BROADBAND PULSED LIGHT SOURCE APPARATUS

BACKGROUND

1. Technical Field

The invention of this application relates to a light source apparatus that emits broadband pulsed light, and also relates to an apparatus and a method for measuring a spectral characteristic of an object using broadband pulsed light.

2. Description of the Related Art

A typical pulsed light source is a pulse oscillation laser (pulsed laser). In recent years, research to broaden the wavelength of the pulsed laser has been actively conducted, and a typical example thereof is generation of super continuum light (hereinafter, referred to as SC light) using a nonlinear optical effect. The SC light is light obtained by passing light from a pulse laser source through a nonlinear element such as a fiber and broadening the wavelength by a nonlinear optical effect such as self-phase modulation or optical soliton.

On the other hand, a spectroscopic measurement technique for irradiating an object with light and measuring a spectrum of light (transmitted light, reflected light, scattered light, or the like) from the object is a typical technique for analyzing the composition and properties of the object. A typical spectroscopic measurement method is a method using a diffraction grating. Light to be measured incident from an incident slit is collimated by a concave mirror and radiated to the diffraction grating, and the dispersed light from the diffraction grating is similarly condensed by a concave mirror. A light receiver is disposed at the condensed position and the light is detected. By changing (scanning) the posture of the diffraction grating, light beams having different wavelengths are sequentially incident on the light receiver, and the output of the light receiver becomes a spectrum.

Such spectroscopic measurement using the diffraction grating requires scanning of the diffraction grating, and thus cannot perform measurement at high speed. In addition, since light is limited in the incident slit, an SN ratio of measurement cannot be increased. Therefore, it is necessary to increase the total amount (light amount) of light incident on the light receiver by repeating scanning several times, and this point also becomes a factor that measurement at high speed cannot be performed.

In recent years, a multichannel spectrometer using an area sensor in which a large number of photoelectric conversion elements are arranged in a line has been developed. In the case of the multichannel type, scanning of the diffraction grating is unnecessary, and thus, high speed measurement can be expected. However, since the basic structure in which the light is limited by the incident slit and is radiated to the diffraction grating with the concave mirror remains as it is, the problem that the SN ratio is small is not solved, and the disadvantage that the measurement time required to obtain the light amount becomes long is not solved.

The broadband pulsed light extends broadly in a wavelength domain, but remains narrow in a pulse width (time width). However, when a group delay in a transmission element such as a fiber is used, the pulse width can also be stretched. At this time, when an element having an appropriate dispersion characteristic is selected, pulse stretching can be performed in a state where the time (elapsed time) and the wavelength of the light in the pulse correspond to each other on a one-to-one basis.

The correspondence relationship between the time and the wavelength in the broadband pulsed light pulse-stretched in this manner (hereinafter, referred to as broadband stretched pulsed light) can be effectively used for spectroscopic measurement. In a case where the broadband stretched pulsed light is received by a certain light receiver, a temporal change of the light intensity detected by the light receiver corresponds to the light intensity of each wavelength, that is, a spectrum. Therefore, a temporal change of an output signal of the light receiver can be converted into a spectrum, and spectroscopic measurement can be performed without using a special dispersive element such as a diffraction grating. That is, by irradiating the object with the broadband stretched pulsed light, receiving light from the object by the light receiver, and measuring the temporal change, the spectral characteristic (for example, spectral transmittance) of the object can be known.

As described above, the broadband stretched pulsed light is particularly useful in the field of spectroscopic measurement and the like. However, according to the research of the inventor, it has been found that when the output of the broadband pulsed light source is increased to radiate stronger light, an unintended nonlinear optical effect occurs in a pulse stretching element, and uniqueness of time and wavelength (one-to-one correspondence) is lost.

SUMMARY

One aspect of the present disclosure is based on this finding, and a first object thereof is to provide a broadband pulsed light source apparatus in which the uniqueness of time and wavelength is not lost even in a case of high output.

In addition, in the case of performing the pulse stretching described above, according to the research of the inventor, there is actually a problem of the characteristic of the element that performs the pulse stretching and the problem of the characteristic of the light receiver that detects the broadband stretched pulsed light, and there is a problem in practical use when the entire spectroscopic measurement system is considered.

A second object of the present disclosure is to solve this practical problem in utilizing the broadband stretched pulsed light for spectroscopic measurement. That is, a second object of the invention of this application is to provide a practical technique capable of performing spectroscopic measurement at high speed with sufficient accuracy over a wide wavelength band.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments, nor to delineate the scope of any or all aspects. Its sole purpose is to present some concepts of one or more embodiments in a simplified form as a prelude to the more detailed description that is presented later.

A broadband pulsed light source apparatus according to one embodiment includes: a broadband pulsed light source; and a stretching module structured to stretch a pulse width of broadband pulsed light from the broadband pulsed light source such that an elapsed time and a wavelength of light in a pulse correspond to each other on a one-to-one basis. The stretching module includes: a dividing element structured to spatially divide the broadband pulsed light from the broadband pulsed light source into two beams according to a wavelength range; and two stretching fibers having different dispersion characteristics. An incident end of each of the two stretching fibers is located at a position where a corresponding one of the two beams having a corresponding wavelength range spatially divided by the dividing element is incident. In addition, each of the two stretching fibers has a dispersion characteristic such that two beams of stretched pulsed light are emitted from the two stretching fibers and the two beams of the stretched pulsed light do not temporally completely overlap with each other.

In one embodiment, an emission end of each of the two stretching fibers may be disposed such that the two beams of the stretched pulsed light are radiated so as to overlap with each other on the same irradiation region.

In one embodiment a multiplexing element structured to superimpose the two beams of stretched pulsed light on each other and to cause the two beams of the stretched pulsed light to travel along the same optical path may be disposed on an emission side of each of the stretching fibers.

In one embodiment, the two stretching fibers may have dispersion characteristics in which the two beams of the stretched pulsed light are emitted with a separation of 20 picoseconds or more.

In one embodiment, the two stretching fibers may have dispersion characteristics in which a/b is 2 or less, where a is the largest slope of wavelength to time and b is the smallest slope of wavelength to time in an entire wavelength band of the stretched broadband pulsed light.

In one embodiment, in the broadband pulsed light source apparatus, one of the two stretching fibers may be a single-mode fiber, and the other of the two stretching fibers may be a dispersion-shifted fiber.

In one embodiment, the broadband pulsed light source may be a super continuum light source.

In one embodiment, a time range in which the beams of the broadband pulsed light stretched and emitted do not temporally overlap with each other may be 100 nm or more in a case of corresponding to a wavelength.

In one embodiment, a spectroscopic measurement apparatus according to the invention of this application includes: the broadband pulsed light source apparatus; a light receiver structured to receive light from an object irradiated with broadband pulsed light emitted from the broadband pulsed light source apparatus; and a calculator structured to perform processing of converting an output signal from the light receiver into a spectrum.

In one embodiment, the spectroscopic measurement apparatus may have a configuration in which a branching element structured to branch an optical path from the broadband pulsed light source apparatus into a measurement optical path and a reference optical path is provided, the light receiver is disposed at a position on the measurement optical path where light from the object irradiated with the broadband pulsed light is received, a reference light receiver is disposed at a position on the reference optical path where the broadband pulsed light without passing through the object is received, and the calculator is structured to convert an output signal from the reference light receiver into a spectrum to obtain reference spectrum data.

In one embodiment, a spectroscopic measurement method according to the invention of this application includes: an irradiation step of irradiating an object with broadband pulsed light emitted from the broadband pulsed light source apparatus; a light receiving step of receiving, by a light receiver, light from the object irradiated with the broadband pulsed light in the irradiation step; and a calculating step of performing processing of converting an output signal from the light receiver into a spectrum by a calculator.

In one embodiment, the spectroscopic measurement method may have a configuration in which the irradiation step is a step of dividing light from the broadband pulsed light source apparatus into measurement light and reference light and irradiating an object with the measurement light, the light receiving step is a step of receiving light from the object irradiated with the measurement light by the light receiver, and the spectroscopic measurement method further includes: a reference light reception step of receiving the reference light by a reference light receiver without passing through the object; and a reference spectrum data acquisition step of converting an output signal from the reference light receiver into a spectrum, by the calculator, to obtain reference spectrum data.

A spectroscopic measurement apparatus according to one embodiment includes:
  a broadband pulsed light source;
  a stretching element structured to stretch a pulse width of broadband pulsed light from the broadband pulsed light source such that a relationship between an elapsed time and a wavelength in a pulse is one-to-one;
  a dividing element structured to divide the broadband pulsed light having the pulse width stretched by the stretching element into two;
  a first light receiver structured to receive light from an object irradiated with one of the light beams divided by the dividing element;
  a second light receiver structured to receive light from an object irradiated with the other of the light beams divided by the dividing element; and
  a calculator structured to convert a temporal change of an output from the first light receiver and a temporal change of an output from the second light receiver into a spectrum,
  in which the first and second light receivers have different spectral sensitivity characteristics.

In one embodiment, the spectroscopic measurement apparatus may have a configuration in which the first light receiver is a light receiver having higher spectral sensitivity than the second light receiver in a first wavelength range, and the second light receiver is a light receiver having higher spectral sensitivity than the first light receiver in a second wavelength range different from the first wavelength range, and the calculator is structured to convert the temporal change of the output from the first light receiver into a spectrum for the first wavelength range, and convert the temporal change of the output from the second light receiver into a spectrum for the second wavelength range.

In one embodiment, a spectroscopic measurement apparatus according to the invention of this application includes:
  a broadband pulsed light source;
  a stretching element structured to stretch a pulse width of broadband pulsed light from the broadband pulsed light source such that a relationship between an elapsed time and a wavelength in a pulse is one-to-one;
  a dividing element structured to divide the broadband pulsed light having the pulse width stretched by the stretching element into a long wavelength and a short wavelength with a division wavelength as a boundary;
  a first light receiver structured to receive light from an object irradiated with a light beam having the long wavelength among light beams divided by the dividing element;

a second light receiver structured to receive light from an object irradiated with a light beam having the short wavelength among the light beams divided by the dividing element; and a calculator structured to convert a temporal change of an output from the first light receiver and a temporal change of an output from the second light receiver into a spectrum.

In one embodiment, a spectroscopic measurement apparatus according to the invention of this application includes:
a broadband pulsed light source;
a dividing element structured to divide broadband pulsed light emitted from the broadband pulsed light source into a long wavelength and a short wavelength with a division wavelength as a boundary;
a first stretching element that stretches a pulse width of a light beam having the long wavelength divided by the dividing element such that a relationship between an elapsed time and the wavelength in a pulse is one-to-one;
a second stretching element that stretches a pulse width of a light beam having the short wavelength divided by the dividing element such that a relationship between an elapsed time and the wavelength in a pulse is one-to-one;
a first light receiver structured to receive light from an object irradiated with the light beam having the pulse width stretched by the first stretching element;
a second light receiver structured to receive light from an object irradiated with the light beam having the pulse width stretched by the second stretching element; and
a calculator structured to convert a temporal change of an output from the first light receiver and a temporal change of an output from the second light receiver into a spectrum.

A spectroscopic measurement apparatus according to one embodiment includes:
a broadband pulsed light source;
a stretching element structured to stretch a pulse width of broadband pulsed light from the broadband pulsed light source such that a relationship between an elapsed time and a wavelength in a pulse is one-to-one;
a dividing element structured to divide light from an object irradiated with the broadband pulsed light stretched by the stretching element into two;
a first light receiver structured to receive one of the light beams divided by the dividing element;
a second light receiver structured to receive the other of the light beams divided by the dividing element; and
a calculator structured to convert a temporal change of an output from the first light receiver and a temporal change of an output from the second light receiver into a spectrum,
in which the first and second light receivers have different spectral sensitivity characteristics.

In one embodiment, the spectroscopic measurement apparatus may have a configuration in which the first light receiver is a light receiver having higher spectral sensitivity than the second light receiver in a first wavelength range, and the second light receiver is a light receiver having higher spectral sensitivity than the first light receiver in a second wavelength range different from the first wavelength range, and the calculator is structured to convert the temporal change of the output from the first light receiver into a spectrum for the first wavelength range, and convert the temporal change of the output from the second light receiver into a spectrum for the second wavelength range.

A spectroscopic measurement apparatus according to one embodiment includes:
a broadband pulsed light source;
a stretching element structured to stretch a pulse width of broadband pulsed light from the broadband pulsed light source such that a relationship between an elapsed time and a wavelength in a pulse is one-to-one;
a dividing element structured to divide light from an object irradiated with the broadband pulsed light stretched by the stretching element into a long wavelength and a short wavelength with a division wavelength as a boundary;
a first light receiver structured to receive a light beam having the long wavelength among light beams divided by the dividing element;
a second light receiver structured to receive a light beam having the short wavelength among the light beams divided by the dividing element; and
a calculator structured to convert a temporal change of an output from the first light receiver and a temporal change of an output from the second light receiver into a spectrum.

A spectroscopic measurement method according to one embodiment includes:
an emission step of causing broadband pulsed light to be emitted from a broadband pulsed light source;
a pulse stretching step of stretching a pulse width of the broadband pulsed light emitted in the emission step by a stretching element such that a relationship between an elapsed time and a wavelength in a pulse is one-to-one;
a division step of dividing the broadband pulsed light having the pulse width stretched in the pulse stretching step into two by a dividing element;
a first light receiving step of receiving, by a first light receiver, light from an object irradiated with one of the light beams divided in the division step;
a second light receiving step of receiving, by a second light receiver, light having a wavelength from an object irradiated with the other of the light beams divided in the division step; and
a calculation step of converting a temporal change of an output from the first light receiver received in the first light receiving step and a temporal change of an output from the second light receiver received in the second light receiving step into a spectrum by a calculator,
in which the first and second light receivers have different spectral sensitivity characteristics.

In one embodiment, the spectroscopic measurement method may have a configuration in which the first light receiver is a light receiver having higher spectral sensitivity than the second light receiver in a first wavelength range, and the second light receiver is a light receiver having higher spectral sensitivity than the first light receiver in a second wavelength range different from the first wavelength range, and the calculation step includes converting the temporal change of the output from the first light receiver into a spectrum for the first wavelength range, and converting the temporal change of the output from the second light receiver into a spectrum for the second wavelength range.

A spectroscopic measurement method according to one embodiment includes:
an emission step of causing broadband pulsed light to be emitted from a broadband pulsed light source;
a pulse stretching step of stretching a pulse width of the broadband pulsed light emitted in the emission step by a stretching element such that a relationship between an elapsed time and a wavelength in a pulse is one-to-one;

a division step of dividing the broadband pulsed light having the pulse width stretched in the pulse stretching step into a long wavelength and a short wavelength with a division wavelength as a boundary by a dividing element;

a first light receiving step of receiving, by a first light receiver, light from an object irradiated with a light beam having the long wavelength among light beams divided in the division step;

a second light receiving step of receiving, by a second light receiver, light from an object irradiated with a light beam having the short wavelength among the light beams divided in the division step; and a calculation step of converting a temporal change of an output from the first light receiver received in the first light receiving step and a temporal change of an output from the second light receiver received in the second light receiving step into a spectrum by a calculator.

A spectroscopic measurement method according to one embodiment includes:

an emission step of causing broadband pulsed light to be emitted from a broadband pulsed light source;

a dividing element structured to divide the broadband pulsed light emitted in the emission step into a long wavelength and a short wavelength with a division wavelength as a boundary;

a first pulse stretching step of pulse-stretching a light beam having the long wavelength among beams of the broadband pulsed light divided in the division step by a first stretching element such that a relationship between an elapsed time and a wavelength in a pulse is one-to-one;

a second pulse stretching step of pulse-stretching a light beam having the short wavelength among the beams of the broadband pulsed light divided in the division step by a second stretching element such that a relationship between an elapsed time and a wavelength in a pulse is one-to-one;

a first light receiving step of receiving, by a first light receiver, light from an object irradiated with the light beam pulse-stretched in the first pulse stretching step;

a second light receiving step of receiving, by a second light receiver, light from an object irradiated with the light beam pulse-stretched in the second pulse stretching step; and a calculation step of converting a temporal change of an output from the first light receiver received in the first light receiving step and a temporal change of an output from the second light receiver received in the second light receiving step into a spectrum.

A spectroscopic measurement method according to one embodiment includes:

an emission step of causing broadband pulsed light to be emitted from a broadband pulsed light source;

a pulse stretching step of stretching a pulse width of the broadband pulsed light emitted in the emission step by a stretching element such that a relationship between an elapsed time and a wavelength in a pulse is one-to-one;

a division step of dividing light from an object irradiated with the broadband pulsed light having the pulse width stretched in the pulse stretching step into two by a dividing element;

a first light receiving step of receiving, by a first light receiver, one of the light beams divided in the division step;

a second light receiving step of receiving, by a second light receiver, the other of the light beams divided in the division step; and a calculation step of converting a temporal change of an output from the first light receiver received in the first light receiving step and a temporal change of an output from the second light receiver received in the second light receiving step into a spectrum by a calculator, in which the first and second light receivers have different spectral sensitivity characteristics.

In one embodiment, the spectroscopic measurement method may have a configuration in which the first light receiver is a light receiver having higher spectral sensitivity than the second light receiver in a first wavelength range, and the second light receiver is a light receiver having higher spectral sensitivity than the first light receiver in a second wavelength range different from the first wavelength range, and the calculation step includes converting the temporal change of the output from the first light receiver into a spectrum for the first wavelength range, and converting the temporal change of the output from the second light receiver into a spectrum for the second wavelength range.

A spectroscopic measurement method according to one embodiment includes:

an emission step of causing broadband pulsed light to be emitted from a broadband pulsed light source;

a stretching step of pulse-stretching a pulse width of the broadband pulsed light emitted in the emission step by a stretching element such that a relationship between an elapsed time and a wavelength in a pulse is one-to-one;

a division step of dividing light from an object irradiated with the broadband pulsed light stretched in the stretching step into a long wavelength and a short wavelength with a division wavelength as a boundary by a dividing element;

a first light receiving step of receiving, by a first light receiver, one of the light beams divided in the division step;

a second light receiving step of receiving, by a second light receiver, the other of the light beams divided in the division step; and a calculation step of converting a temporal change of an output from the first light receiver received in the first light receiving step and a temporal change of an output from the second light receiver received in the second light receiving step into a spectrum.

A spectroscopic measurement method according to one embodiment includes:

a first emission step of causing broadband pulsed light to be emitted from a broadband pulsed light source;

a first pulse stretching step of stretching a pulse width of the broadband pulsed light emitted in the first emission step by a stretching element such that a relationship between an elapsed time and a wavelength in a pulse is one-to-one;

a first irradiation step of irradiating an object with the broadband pulsed light pulse-stretched in the first pulse stretching step;

a first light receiving step of receiving, by a first light receiver, light from the object irradiated in the first irradiation step;

a second emission step of causing the other broadband pulsed light to be emitted from the broadband pulsed light source;

a second pulse stretching step of stretching a pulse width of the broadband pulsed light emitted in the second emission step by the stretching element such that a relationship between an elapsed time and a wavelength in a pulse is one-to-one;

a second irradiation step of irradiating an object with the broadband pulsed light pulse-stretched in the second pulse stretching step;

a second light receiving step of receiving light from the object irradiated in the second irradiation step by a second light receiver having a spectral sensitivity characteristic different from a spectral sensitivity characteristic of the first light receiver; and a calculation step of converting a temporal change of an output from the first light receiver received in the first light receiving step and a temporal change of an output from the second light receiver received in the second light receiving step into a spectrum by a calculator.

In each of the above configurations, the stretching element may be a single-mode fiber, a single-mode multicore fiber, a single-mode fiber bundle fiber, a multimode fiber, a diffraction grating, a chirped fiber Bragg grating, or a prism.

In each of the above configurations, the first stretching element and the second stretching element may be elements having different stretching characteristics.

In each of the above configurations, the dividing element may be any one of a dichroic mirror, a wavelength division multiplexing coupler, a diffraction grating, and an arrayed waveguide grating.

In each of the above configurations, the broadband pulsed light source may be a super continuum light source.

In each of the above configurations, the broadband pulsed light source may be a super continuum light source structured to output light continuous over a wavelength width of at least 10 nm in a wavelength region between 900 nm or more and 1300 nm or less.

In each of the above configurations, the first light receiver may be an InGaAs photodiode light receiver.

In each of the above configurations, the second light receiver may be a Si photodiode light receiver.

In each of the above configurations, the spectroscopic measurement apparatus may further include a moving mechanism structured to move the object between a position irradiated with one of light beams divided by the dividing element or a light beam having a long wavelength among the light beams and a position irradiated with the other of the light beams divided by the dividing element or a light beam having a short wavelength among the light beams.

In each of the above configurations, the spectroscopic measurement apparatus may include a moving mechanism structured to move the object between a position irradiated with a light beam having a pulse width stretched by the first stretching element and a position irradiated with a light beam having a pulse width stretched by the second stretching element.

According to the broadband pulsed light source apparatus according one embodiment, since the broadband pulsed light from the broadband pulsed light source is pulse-stretched by the two stretching fibers, unintended nonlinear optics is suppressed even in the case of a high-output device. Therefore, the broadband pulsed light in which the uniqueness of wavelength to time is maintained high is emitted. At this time, since the two stretching fibers have different dispersion characteristics, a difference in wavelength resolution can be suppressed to be small in the output wavelength range.

In one embodiment, when the emission end of each of the stretching fibers is disposed such that the beams of the broadband pulsed light are irradiated so as to overlap same irradiation region, it is easy to simultaneously radiate the beams of the broadband pulsed light to the same object.

In one embodiment, when the multiplexing element structured to superimpose the beams of the broadband pulsed light on each other and cause the beams of the broadband pulsed light to travel along the same optical path is disposed on the emission side of each of the stretching fibers, it is even easier to simultaneously radiate the beams of the broadband pulsed light to the same object.

In one embodiment, when the two stretching fibers have dispersion characteristics in which the beams of the stretched broadband pulsed light are emitted with a separation of 20 picoseconds or more, it is possible to prevent loss of the uniqueness of wavelength to time in consideration of sufficient safety.

In one embodiment, when the two stretching fibers have dispersion characteristics in which a/b is 2 or less, where a is the largest slope of wavelength to time and b is the smallest slope of the wavelength to time in an entire wavelength band of the stretched broadband pulsed light, the evaluation of the light source apparatus becomes higher.

In one embodiment, when one of the two stretching fibers is a single-mode fiber, and the other of the two stretching fibers is a dispersion-shifted fiber, an excellent broadband pulsed light source apparatus with an improved SN ratio is provided.

In one embodiment, when the broadband pulsed light source is a super continuum light source, pulsed light having a continuous spectrum is emitted in a wider band, so that a light source apparatus that can be used for various applications is provided.

In one embodiment, when a time range in which the beams of the broadband pulsed light stretched and emitted do not temporally overlap with each other is 100 nm or more in a case of corresponding to a wavelength, a more practical broadband pulsed light source apparatus is provided.

In one embodiment, according to the spectroscopic measurement apparatus or the spectroscopic measurement method that irradiates the object with the broadband pulsed light from the broadband pulsed light source apparatus and receives the light from the object by the light receiver as described above, spectroscopic measurement at high speed and with high accuracy can be performed. At this time, since the object can be irradiated with the broadband pulsed light of high illuminance without losing the uniqueness of wavelength to time, the superiority is particularly exhibited in the case of performing spectroscopic measurement on the object having a large amount of absorption.

In one embodiment, when the light from the broadband pulsed light source apparatus is divided into the measurement light and the reference light, the reference light is received by the reference light receiver while irradiating the object with the measurement light, and the output signal from the reference light receiver is converted into the spectrum by the calculator to obtain the reference spectrum data, it is unnecessary to separately acquire the reference spectrum data, so that the efficiency of the entire measurement work is increased.

In one embodiment, according to the spectroscopic measurement apparatus or the spectroscopic measurement method according to the invention of this application, in the spectroscopic measurement using the uniqueness of wavelength to time of the pulse-stretched broadband pulsed light, the detection system is divided into the two detection systems and measurement is performed, so that the detection of light in each wavelength region can be optimized according to the characteristic of the stretching element and the characteristic of the light receivers. Therefore, spectroscopic measurement can be performed at high speed with sufficient accuracy over a wide wavelength band.

In one embodiment, according to the spectroscopic measurement apparatus or the spectroscopic measurement method according to the invention of this application, in the spectroscopic measurement using the uniqueness of wavelength to time of the pulse-stretched broadband pulsed light, the detection system is divided into the two detection systems according to the wavelength region and measurement is performed, so that the detection of light in each wavelength region can be optimized according to the characteristic of the stretching element and the characteristic of the light receivers. Therefore, spectroscopic measurement can be performed at high speed with sufficient accuracy over a wide wavelength band.

In one embodiment, in the configuration in which pulse stretching is performed after wavelength division of the broadband pulsed light by the dividing element, when the first and second stretching elements have different stretching characteristics, pulse stretching can be optimized according to the wavelength region.

In one embodiment, according to the device or the method that divides the light from the object into two and measures the light beams with the two detection systems, it is possible to obtain an effect that the structure becomes simpler and the measurement accuracy is not deteriorated even if the reproducibility of the broadband pulsed light is lowered by any chance.

In one embodiment, when the broadband pulsed light source is a super continuum light source structured to output light continuous over a wavelength width of at least 10 nm in a wavelength region between 900 nm or more and 1300 nm or less, it is particularly useful for spectroscopic analysis of a solid phase or liquid phase object.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 5(1) and 5(2) are diagrams schematically showing a stretching characteristic when pulse stretching is performed using only a single-mode fiber;

FIGS. 6(1) and 6(2) are diagrams schematically showing a stretching characteristic when pulse stretching is performed using the single-mode fiber and a dispersion-shifted fiber;

FIGS. 7(1) and 7(2) are diagrams schematically showing an attenuation characteristic of each stretching fiber used in the broadband pulsed light source apparatus of the embodiment.

FIGS. 8(1) and 8(2) are diagrams showing a result of simulation calculation of an SN ratio;

FIGS. 9(1) and 9(2) are schematic diagrams showing temporal separation of beams of the broadband pulsed light in a stretching module;

FIG. 11 is a diagram schematically showing a main part of an example of a measurement program included in the spectroscopic measurement apparatus of the first embodiment;

FIGS. 22(1) and 22(2) are schematic diagrams showing an example of another dividing element;

FIGS. 26(1)-26(3) are schematic diagrams showing another example of the stretching element.

DESCRIPTION OF EMBODIMENTS

Next, modes (embodiments) for carrying out the invention of this application will be described.

Figure 1:
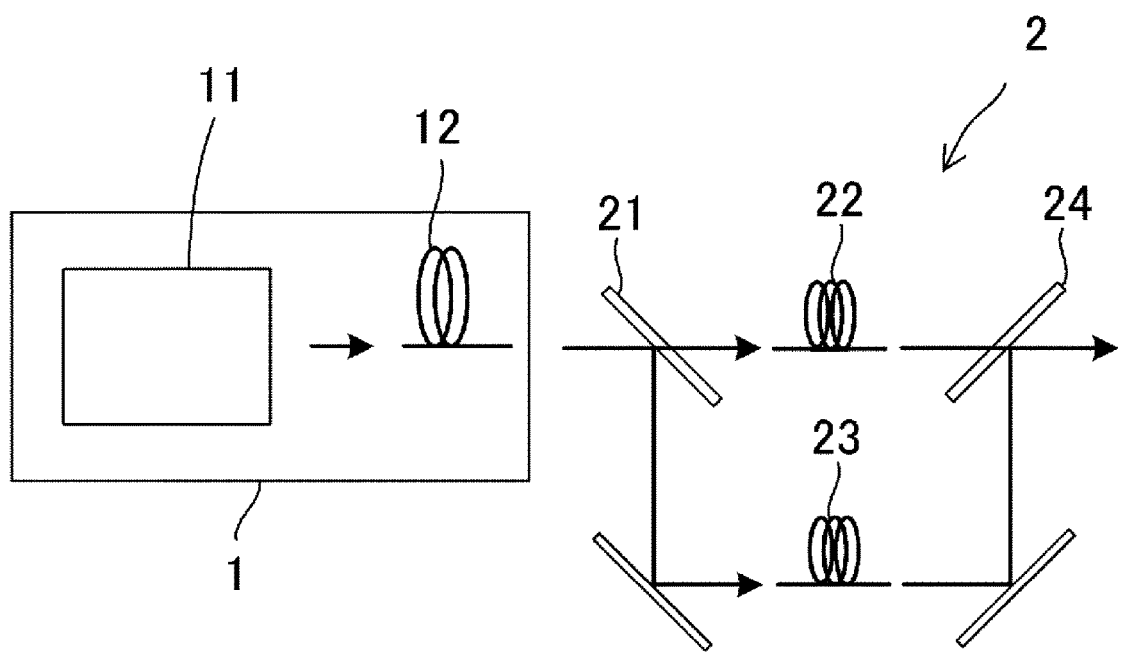
FIG. 1 is a schematic diagram of a broadband pulsed light source apparatus of an embodiment.

First, embodiments of the invention of a broadband pulsed light source apparatus will be described. FIG. 1 is a schematic diagram of the broadband pulsed light source apparatus of the embodiment. The broadband pulsed light source apparatus shown in FIG. 1 includes a broadband pulsed light source 1 and a stretching module 2. The stretching module 2 is a module that pulse-stretches light from the broadband pulsed light source 1 such that the relationship between the elapsed time and the wavelength of the light in one pulse is one-to-one.

The broadband pulsed light source 1 is a light source that emits light having a continuous spectrum over a wavelength width of at least 10 nm, 50 nm, or 100 nm in a range of 900 nm to 1300 nm. The range of 900 nm to 1300 nm is set because the light source apparatus of the embodiment is used for light measurement in this wavelength region.

The light having the continuous spectrum over the wavelength width of at least 10 nm, 50 nm, or 100 nm is typically SC light. Therefore, in this embodiment, the broadband pulsed light source 1 is an SC light source. However, other broadband pulsed light sources such as a superluminescent diode (SLD) light source may be used.

The broadband pulsed light source 1, which is an SC light source, includes an ultrashort pulse laser 11 and a nonlinear element 12. As the ultrashort pulse laser 11, a gain-switched laser, a microchip laser, a fiber laser, or the like can be used. A fiber is often used as the nonlinear element 12. For example, a photonic crystal fiber or other fibers in which nonlinearity occurs by inputting a pulse can be used as the nonlinear element 12. As a mode of the fiber, a single-mode fiber is often used from the viewpoint of measurement stability, but also a multimode can be used as the nonlinear element 12 as long as it exhibits sufficient nonlinearity and can obtain expected measurement stability in a measurement wavelength range.

The stretching module 2 forms a major feature of the broadband pulsed light source apparatus of the embodiment. The light emitted from the broadband pulsed light source 1 spreads as a wavelength band, but remains as an ultrashort pulse on the order of femtoseconds to picoseconds as a pulse width. Since it is difficult to use as it is, pulse stretching is performed by the stretching module 2. What is important at this time is that a configuration of performing stretching such that the relationship between the elapsed time and the wavelength in one pulse is one-to-one is adopted. At this time, the light source apparatus of the embodiment adopts a configuration constructed such that an unintended nonlinear optical effect is not generated.

Figure 2:
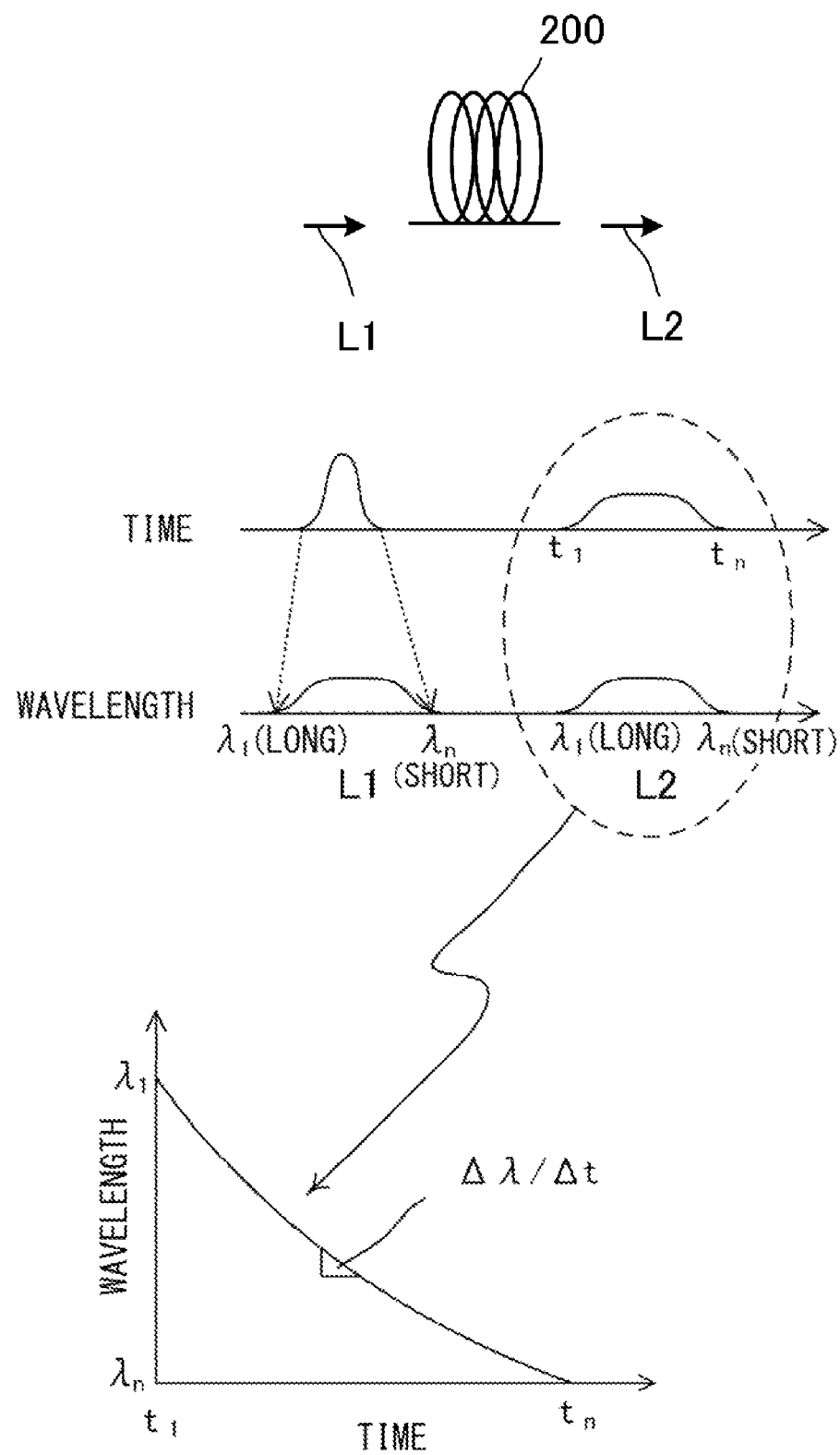
FIG. 2 is a schematic diagram showing a principle of pulse stretching of broadband pulsed light.

When broadband pulsed light is pulse-stretched, an unintended nonlinear optical effect occurs, and the uniqueness of wavelength to time is lost, which is a problem confirmed in the course of research by the inventor. Hereinafter, this point will be described with reference to FIGS. 2 and 3. FIG. 2 is a schematic diagram showing a principle of pulse stretching of the broadband pulsed light.

As means for stretching the pulse width of the broadband pulsed light such as SC light, a configuration using a fiber having a specific dispersion characteristic (group velocity dispersion characteristic) such as a dispersion compensation fiber is suitably adopted. Hereinafter, a fiber used for this purpose is referred to as a stretching fiber. For example, when SC light L1 having a continuous spectrum in a certain wavelength range is passed through a stretching fiber 200 having a positive dispersion characteristic in the wavelength range, the pulse width is effectively stretched. That is, as shown in FIG. 2, in the SC light L1, though it is an ultrashort pulse, light having a longest wavelength $\lambda_1$ at the beginning of one pulse exists, light having a shorter wavelength gradually exists as time elapses, and light having a shortest wavelength $\lambda_n$ exists at the end of the pulse. When this light is passed through the normally dispersed stretching fiber 200, in the normally dispersed stretching fiber 200, light having a shorter wavelength propagates with a delay. Therefore, a time difference in one pulse is increased, and when the light is emitted from the stretching fiber 200, the light having a shorter wavelength is further delayed as compared with light having a longer wavelength. As a result, SC light L2 to be emitted is light having the stretched pulse width in a state where the uniqueness of wavelength to time is secured. That is, as shown on the lower side of FIG. 2, in times $t_1$ to $t_n$, pulse stretching is performed in a one-to-one correspondence with the wavelengths $\lambda_1$ to $\lambda_n$.

It is also possible to use an anomalous dispersion fiber as the stretching fiber 200 for pulse stretching. In this case, in the SC light, the light on the long wavelength side existing at the beginning of the pulse is delayed, and the light on the short wavelength side existing at the later time is dispersed in the traveling state. Therefore, the temporal relationship in one pulse is reversed, and pulse stretching is performed in the state where the light on the short wavelength side exists at the beginning of one pulse and the light on the longer wavelength side exists with the lapse of time. However, as compared with the case of normal dispersion, it is often necessary to further increase the propagation distance for pulse stretching, and the loss tends to be large. Therefore, normal dispersion is preferable in this respect.

In such a broadband pulsed light source apparatus, a higher-output device may be required. For example, in the case of measuring an absorption spectrum by irradiating an object having a large amount of absorption with light and dispersing the transmitted light, it is necessary to irradiate the object with strong light, and thus a high-output broadband pulsed light source apparatus is required. In addition, from the viewpoint of increasing an SN ratio of the measurement or performing the measurement at high speed, it may be necessary to irradiate the object with strong light.

In order to irradiate the object with the pulse-stretched light with high illuminance, it is necessary to cause broadband pulsed light to be incident on the stretching fiber with high intensity and to perform pulse stretching while maintaining high intensity. However, when the high-intensity broadband pulsed light is incident on the stretching fiber, an unintended nonlinear optical effect may occur, and the uniqueness of wavelength to time may be lost.

Figure 3:
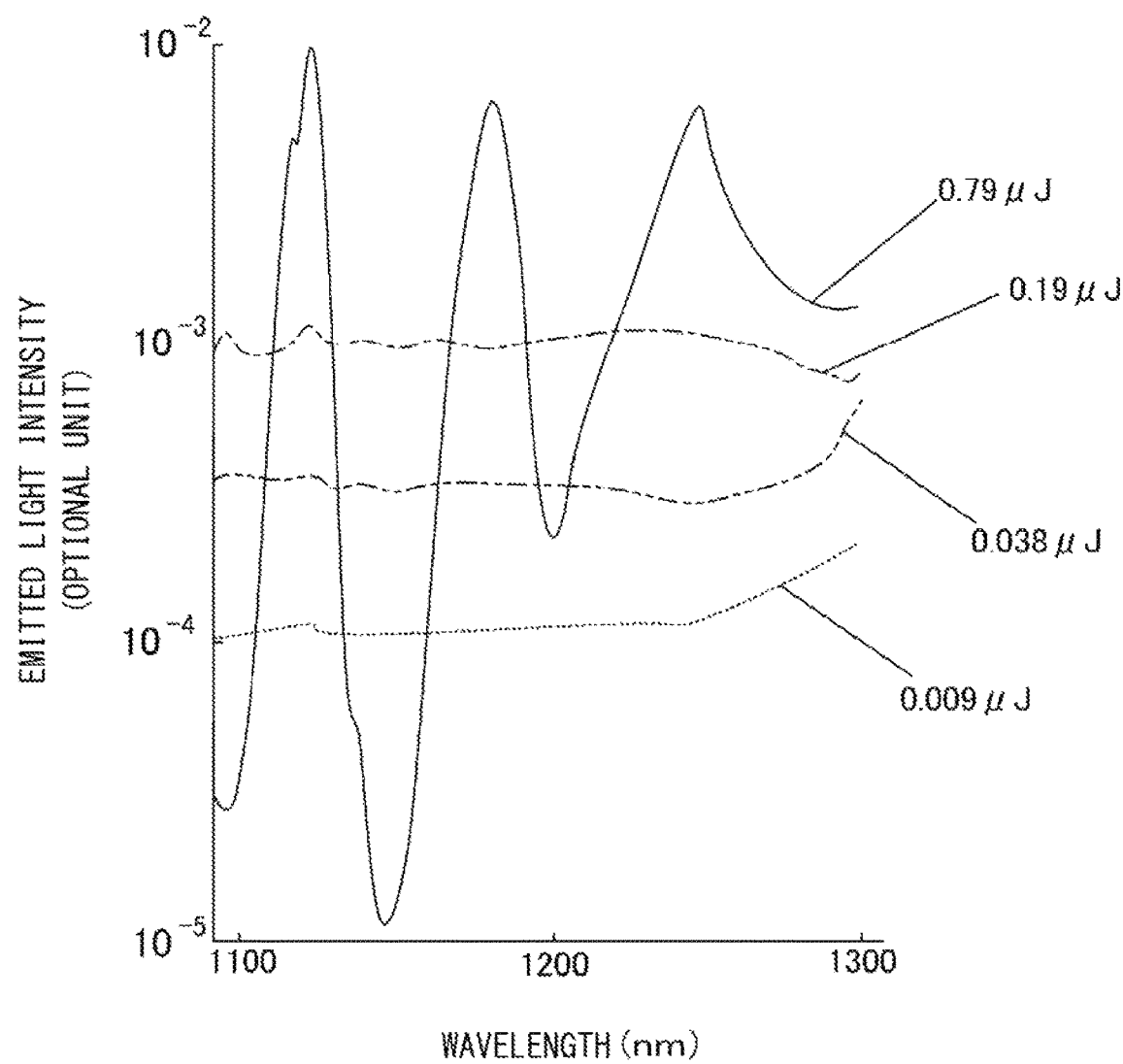
FIG. 3 is a diagram showing a result of an experiment in which an unintended nonlinear optical effect in the case of pulse-stretched high-intensity broadband pulsed light with a stretching fiber is confirmed.

FIG. 3 is a diagram showing a result of an experiment in which an unintended nonlinear optical effect in the case of pulse-stretched high-intensity broadband pulsed light with the stretching fiber is confirmed. In FIG. 3, the vertical axis is a logarithmic scale.

In the experiment showing the results in FIG. 3, microchip laser light having a center wavelength of 1064 nm and a pulse width of 2 nanoseconds was caused to enter a photonic crystal fiber as a nonlinear element to obtain SC light, and a single-mode fiber having a length of 5 km was used as a stretching fiber to perform pulse stretching. The single-mode fiber is a normally dispersed fiber in a range of 1100 nm to 1200 nm. At this time, the energy of the incident SC light to the single-mode fiber was changed to 0.009 μJ, 0.038 μJ, 0.19 μJ, and 0.79 μJ.

As shown in FIG. 3, when the energy of the SC light is up to 0.19 μJ, there is no large variation in the emitted light intensity in the wavelength range of 1100 nm to 1200 nm, but when the energy of the SC light is 0.79 μJ, the emitted light intensity drastically fluctuates according to the wavelength. Such a variation indicates that an unintended further nonlinear optical effect has occurred in the SC light in the process of being incident on and propagating through the single-mode fiber as the stretching fiber. When such a nonlinear optical effect occurs, a new wavelength is generated at another time, so that the uniqueness of wavelength to time is lost. In the experiment showing the results in FIG. 3, since the pulse width of the incident SC light has not changed, it means that the peak value has been changed.

The inventor has optimized the configuration of pulse stretching based on such findings. Specifically, in the broadband pulsed light source apparatus of the embodiment, as shown in FIG. 1, the stretching module 2 includes two stretching fibers 22 and 23, and a configuration in which pulse stretching is performed while the light is divided into the stretching fibers 22 and 23 is adopted.

When pulse stretching is performed while the light is divided into two fibers, the energy of light propagating through one fiber can be reduced, so that an unintended nonlinear optical effect as described above can be suppressed. Therefore, it is possible to realize a broadband pulsed light source apparatus in which the uniqueness of wavelength to time is kept high while achieving high output. The device of the embodiment is based on such an idea.

As a configuration in which pulse stretching is performed while the light is divided into two fibers, a configuration in which the light is simply divided into two light waves, and each of the light waves is incident on a stretching fiber and is subjected to pulse stretching is considered. This configuration is a configuration in which light from a broadband pulsed light source is split by a beam splitter and incident on each of the stretching fibers. Although such a configuration may be adopted, the device of the embodiment is further optimized in the configuration and realizes a function of suppressing a difference in wavelength resolution to be small over a certain wavelength range.

Specifically, as shown in FIG. 1, in the broadband pulsed light source apparatus of the embodiment, the stretching module 2 includes dividing elements 21 that spatially divide light according to a wavelength. As the dividing elements 21, for example, dichroic mirrors are used. Then, the incident ends of the respective stretching fibers 22 and 23 are disposed at positions where the light beams divided according to the wavelength by the dividing elements 21 are incident.

The two stretching fibers 22 and 23 have different dispersion characteristics. That is, the device of the embodiment adopts a configuration in which the light from the broadband pulsed light source 1 is pulse-stretched by the two fibers 22 and 23 having different dispersion characteristics according to the wavelength.

Figure 4:
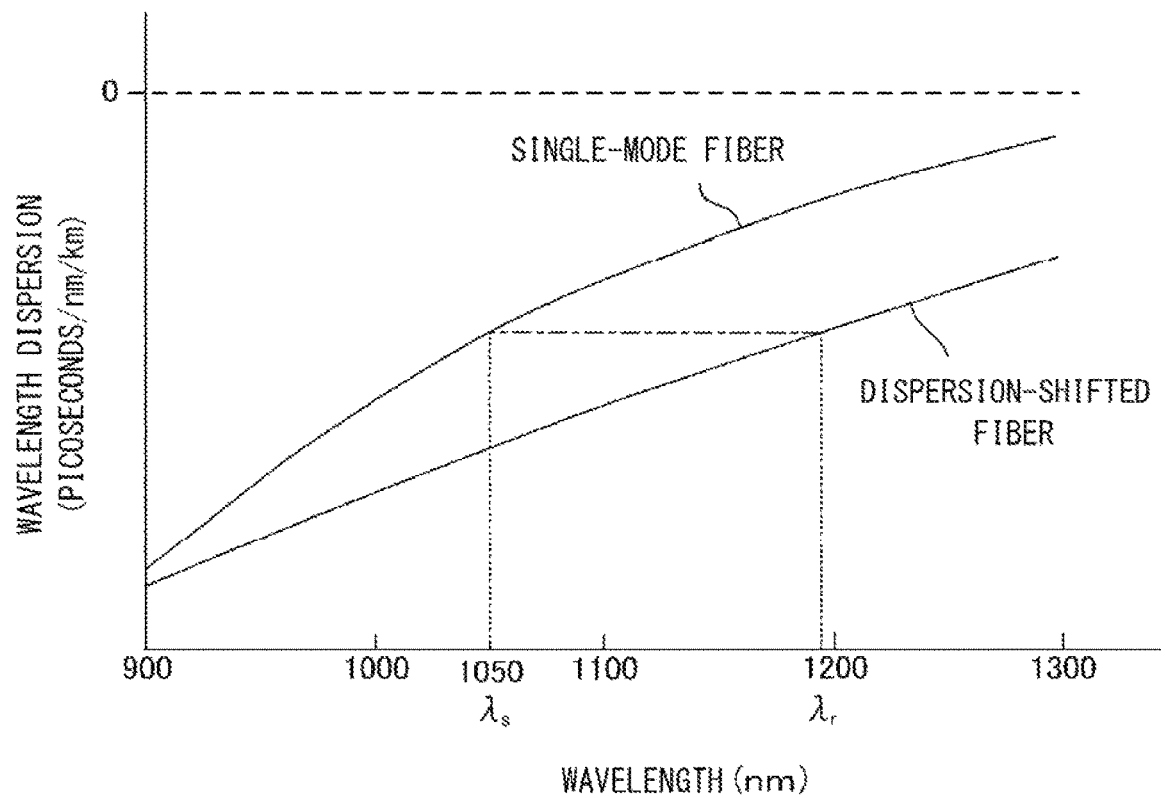
FIG. 4 is a schematic diagram showing dispersion characteristics of two stretching fibers used in the broadband pulsed light source apparatus of the embodiment.

FIG. 4 is a schematic diagram showing dispersion characteristics of the two stretching fibers 22 and 23 used in the stretching module of the broadband pulsed light source apparatus of the embodiment. In this embodiment, a fiber for optical communication is used for both of the two stretching fibers 22 and 23. The two stretching fibers are referred to as a first stretching fiber 22 and a second stretching fiber 23. In the example shown in FIG. 4, the first stretching fiber 22 is a single-mode fiber, and the second stretching fiber 23 is a dispersion-shifted fiber.

As is well known, the single-mode fiber for optical communication has zero dispersion around 1310 nm, and the dispersion value is negative at a wavelength shorter than that. As is well known, the dispersion-shifted fiber is a fiber in which the dispersion is shifted to the long wavelength side, and the zero dispersion is around 1550 nm. Therefore, in the dispersion-shifted fiber, the dispersion value is negative on the short wavelength side from around 1550 nm.

Although the broadband pulsed light source apparatus of the embodiment uses such a fiber for communication, the useful wavelength band is about 900 to 1300 nm unlike optical communication. That is, it is a light source that emits broadband pulsed light in a wavelength region shorter than that of optical communication.

As shown in FIG. 4, in the range of 900 to 1300 nm, both the single-mode fiber and the dispersion-shifted fiber have negative dispersion values, but the dispersion-shifted fiber has a larger absolute value.

When pulse stretching is performed separately according to the wavelength using such two fibers having different dispersion characteristics, in addition to the effect of suppressing an unintended nonlinear optical effect, an effect of suppressing a difference in wavelength resolution to be small is also exerted. This point is shown in FIGS. 5 and 6.

FIG. 5 is a diagram schematically showing a stretching characteristic when pulse stretching is performed using only the single-mode fiber. Specifically, FIG. 5(1) shows a relationship of wavelength to time after stretching, and FIG. 5(2) shows a difference in wavelength resolution (wavelength characteristic of wavelength resolution) for each wavelength. That is, the stretching characteristic refers to a characteristic of pulsed light that has been subjected to pulse stretching by a stretching fiber, such as a relationship of wavelength to time in a pulse and a wavelength characteristic of wavelength resolution for each wavelength.

As shown in FIG. 4, in the case of the single-mode fiber, the dispersion value (absolute value) is considerably reduced because the dispersion becomes close to zero dispersion as approaching the long wavelength side from around 1100 nm. The small dispersion value means that the difference in the group delay of the light having each wavelength becomes small (that is, there is a large overlap of the light waves of the respective wavelengths) with respect to the change in time, and means that the wavelength resolution becomes low. In the case of only the single-mode fiber, as shown in FIG. 5(2), the wavelength resolution is considerably deteriorated on the long wavelength side.

FIG. 6 is a diagram schematically showing a stretching characteristic when pulse stretching is performed using the single-mode fiber and the dispersion-shifted fiber. Similarly, FIG. 6(1) shows a relationship of wavelength to time after stretching, and FIG. 6(2) shows a difference in wavelength resolution depending on the wavelength.

When pulse stretching is performed separately by the single-mode fiber and the dispersion-shifted fiber, the difference in wavelength resolution is suppressed to be small as shown in FIG. 6. In this example, light is divided at a boundary of 1050 nm, light having a shorter wavelength is pulse-stretched by the single-mode fiber, and light having a longer wavelength is pulse-stretched by the dispersion-shifted fiber.

That is, it is preferable that the dispersion value of the stretching fiber is a constant large value in the useful wavelength range, but since such an ideal fiber is difficult to realize in reality, the technical idea is that fibers are used properly according to the wavelength range, and wavelength dispersion which is flat (a small difference depending on the wavelength) with a large absolute value is achieved in a necessary wavelength range.

The wavelength resolution actually depends on the response speed (signal discharge cycle) of a light receiver. If an expensive high-speed light receiver is used, the wavelength resolution becomes high even if the dispersion is low. If a low-speed light receiver is used, the wavelength resolution becomes low even if the dispersion is high. However, in order to enhance the evaluation of the light source apparatus, it is important to suppress the difference of $\Delta\lambda/\Delta t$ to be small, that is, to prevent the ratio of the change in wavelength with respect to the change in time from greatly varying depending on the wavelength regardless of the type of light receiver to be used. This is because the small difference in $\Delta\lambda/\Delta t$ prevents the wavelength resolution from greatly varying depending on the wavelength band to be measured. As can be seen from the above description of wavelength resolution, this requirement can be realized by combining stretching fibers having different dispersion characteristics. For example, the maximum value is preferably 2 or less with respect to the minimum value of $\Delta\lambda/\Delta t$ in the output wavelength range.

In addition, an example in which the single-mode fiber and the dispersion-shifted fiber are combined is suitable for improving the quality of light. This point will be described below.

FIG. 7 is a diagram schematically showing an attenuation characteristic of each stretching fiber used in the broadband pulsed light source apparatus of the embodiment. FIG. 7(1) shows an attenuation characteristic of the single-mode fiber, and FIG. 7(2) shows an attenuation characteristic of the dispersion-shifted fiber.

As shown in FIG. 7, the single-mode fiber has a characteristic that attenuation increases linearly as the wavelength decreases in a wavelength range of 900 nm to 1300 nm. The attenuation of the dispersion-shifted fiber is as small as less than 1 up to about 1100 nm, but the attenuation rapidly increases when the wavelength is shorter than about 1050 nm, and the attenuation is larger than that of the single-mode fiber on the short wavelength side.

As described above, in this embodiment, the light on the short wavelength side in the range of about 900 nm to 1050 nm is pulse-stretched by the single-mode fiber, and the light on the long wavelength side in the range of about 1050 nm to 1300 nm is pulse-stretched by the dispersion-shifted fiber. As can be seen from FIG. 7, this configuration is configured such that pulse stretching is performed by the single-mode fiber on the short wavelength side where the attenuation remarkably increases in the dispersion-shifted fiber, and pulse stretching is performed by the dispersion-shifted fiber having a constant small attenuation value on the long wavelength side. That is, an optimal fiber is used for not only group delay but also attenuation according to the wavelength region.

FIG. 8 is a diagram showing a result of simulation calculation of the SN ratio. FIG. 8(1) shows a calculation result of the SN ratio characteristic in the case of the single-mode fiber, and FIG. 8(2) shows a calculation result of the SN ratio characteristic in the case of using the single-mode fiber and the dispersion-shifted fiber.

Each stretching fiber generates noise in the process of light propagation, and the broadband pulsed light source 1 also generates noise slightly. In the simulation showing the results in FIG. 8, it was confirmed how much the SN ratios were different when these noise conditions were the same.

As shown in FIG. 8(1), in the case of only the single-mode fiber, the SN ratio remains at a small value on the short wavelength side. On the other hand, as shown in FIG. 8(2), when the single-mode fiber and the dispersion-shifted fiber are used, the SN ratio is greatly improved on the shorter wavelength side than around 1050 nm.

As described above, in the broadband pulsed light source apparatus of the embodiment, the plurality of stretching fibers 22 and 23 are used in the stretching module 2, and pulse stretching is performed separately according to the wavelength band, and the stretching fibers 22 and 23 optimal for each wavelength band are used. Therefore, it is possible to provide an excellent broadband pulsed light source apparatus in which the uniqueness of wavelength to time is kept high even with high output, the difference in wavelength resolution is suppressed to be small, and the SN ratio is also improved.

Even in a case where it is not particularly necessary to achieve high output, the stretching module 2 may include the two stretching fibers 22 and 23 having different dispersion characteristics. This is because there is a case where it is necessary to reduce the difference in wavelength resolution or improve the SN ratio even in a case where high output is not necessary.

As shown in FIG. 1, the stretching module 2 includes multiplexing elements 24 on the emission side of each of the stretching fibers 22 and 23. The multiplexing elements 24 are elements that superimpose beams of broadband pulsed light stretched and emitted and cause the light beams to advance along the same optical path. As the multiplexing elements 24, dichroic mirrors having the same characteristic as those of the dividing elements 21 can be used. In the above example, the dichroic mirror is a dichroic mirror that transmits light having a wavelength of less than 1050 nm and reflects light having a wavelength of 1050 nm or more.

When the multiplexing elements 24 are used, it is easier to irradiate the same irradiation region with the separately pulse-stretched light beams in a superimposed manner. However, even if the multiplexing elements 24 are not disposed, it is possible to easily irradiate the irradiation region with light in a superimposed manner by setting the emission end of each stretching fiber to have an appropriate posture with respect to the irradiation region. In any case, if the separately pulse-stretched light beams are radiated to the same irradiation region in a superimposed manner, it is easy to irradiate the same object with the light.

In the broadband pulsed light source apparatus of the embodiment as described above, it is necessary that the beams of the broadband pulsed light stretched by the stretching fibers 22 and 23 do not temporally overlap with each other. That is, it is necessary that the stretching fibers 22 and 23 having different dispersion characteristics stretch the beams of the broadband pulsed light such that the beams of the broadband pulsed light after stretching are temporally separated. Hereinafter, this point will be described with reference to FIG. 9. FIG. 9 is a schematic diagram showing temporal separation of the beams of the broadband pulsed light in the stretching module 2.

As shown in FIG. 4, in the broadband pulsed light source apparatus of the embodiment, the stretching fibers 22 and 23 both having a negative dispersion value in the output wavelength band are used. Therefore, as the wavelength becomes shorter, the light propagates and is emitted with a delay. In this case, when the two stretching fibers 22 and 23 are used without particular attention, two pulses P1 and P2 after stretching tend to temporally overlap with other as shown in FIG. 9(1).

That is, in this embodiment, basically, since the stretching fibers 22 and 23 having a negative dispersion value within the output wavelength range are used, as described above, as the wavelength becomes shorter, the light is emitted with a delay. Therefore, for a certain wavelength (hereinafter, referred to as a division wavelength) $\lambda_s$, although there is a difference in the absolute value of dispersion depending on the fiber, basically, light having a wavelength longer than $\lambda_s$ is emitted early, and light having a wavelength shorter than $\lambda_s$ is emitted with a delay.

However, if no particular consideration is given, the two pulses P1 and P2 are not completely separated temporally, and partially overlap with each other. Similarly, in an example in which the single-mode fiber is used for a short wavelength and the dispersion-shifted fiber is used for a long wavelength, when the division wavelength is 1050 nm, the dispersion value (absolute value) of the dispersion-shifted fiber is larger than that of the single-mode fiber at 1050 nm as shown in FIG. 4. This means that when the fiber lengths are the same, light of 1050 nm is emitted with a delay when propagating through the dispersion-shifted fiber. That is, the magnitude of the group delay is reversed. When the wavelength is further longer than 1050 nm, the dispersion decreases, and thus the delay decreases. Nevertheless, the reversal of the group delay continues in a certain wavelength range, and the reversal is canceled beyond a certain wavelength. The wavelength at which the reversal is canceled is a wavelength at which the dispersion-shifted fiber has the same dispersion value as the dispersion value of the single-mode fiber at 1050 nm. Hereinafter, the wavelength at which the reversal is canceled is referred to as a cancellation wavelength, and is indicated by $\lambda_r$ in FIG. 4. The reversal of the group delay occurs from the division wavelength $\lambda_s$ to the cancellation wavelength $\lambda_r$, and in a case where the lengths of the stretching fibers 22 and 23 are the same, the pulses P1 and P2 emitted from the stretching fibers 22 and 23 temporally overlap with each other.

The fact that the two pulses temporally overlap means that the uniqueness of wavelength to time is not ensured in a portion where the two pulses temporally overlap with each other. That is, when two pulses are received by one light receiver, two light beams having different wavelengths are received at the same time.

In order to prevent the two pulses after stretching from overlapping with each other, it is only required to lengthen the fiber (single-mode fiber in this embodiment) responsible for the short wavelength side and to increase the group delay as a whole. When a difference in length is appropriately made according to the wavelength width in which the reversal occurs in the dispersion characteristic, as shown in FIG. 9(2), the two pulses P1 and P2 are temporally separated, so that the two pulses do not temporally overlap with each other. If there is a sufficient difference in group delay as a whole at the division wavelength $\lambda_s$, the two pulses P1 and P2 are sufficiently separated.

In practice, the light beams stretched by the two stretching fibers 22 and 23 are received by different light receivers, and then, outputs of the light receivers are observed with one oscilloscope to confirm overlapping of pulses. Then, the lengths of the fibers are variously changed, and each length at which the overlap is sufficiently canceled is set.

The width of the temporal separation between the two pulses P1 and P2 (indicated by τ in FIG. 9(2)) is preferably 40 picoseconds or more, and more preferably 80 picoseconds or more in consideration of safety.

However, practically, it is not necessary to completely separate. This is because, even if the pulses partially overlap with each other, the uniqueness of wavelength to time can be secured in the non-overlapping wavelength region, and the wavelength region can be used. The non-overlapping portion is preferably set to 100 nm or more in a case where the non-overlapping portion is made to correspond to a wavelength because a more practical device can be made. In addition, the non-overlapping portion is preferably ½ or more, more preferably ⅔ or more, and still more preferably ¾ or more of the entire wavelength width of the broadband pulsed light.

The broadband pulsed light source apparatus of the embodiment adopts the SC light source as the broadband pulsed light source 1, and this point has significance that use for various applications is possible. In the case of the SC light source, since the nonlinear optical effect is used, it is possible to emit pulsed light in a wider band. Since the required wavelength of light varies depending on the application, a light source apparatus in a broader band has a great advantage in that one device can be used for various applications.

Next, a spectroscopic measurement apparatus and a spectroscopic measurement method of a first embodiment will be described.

Figure 10:
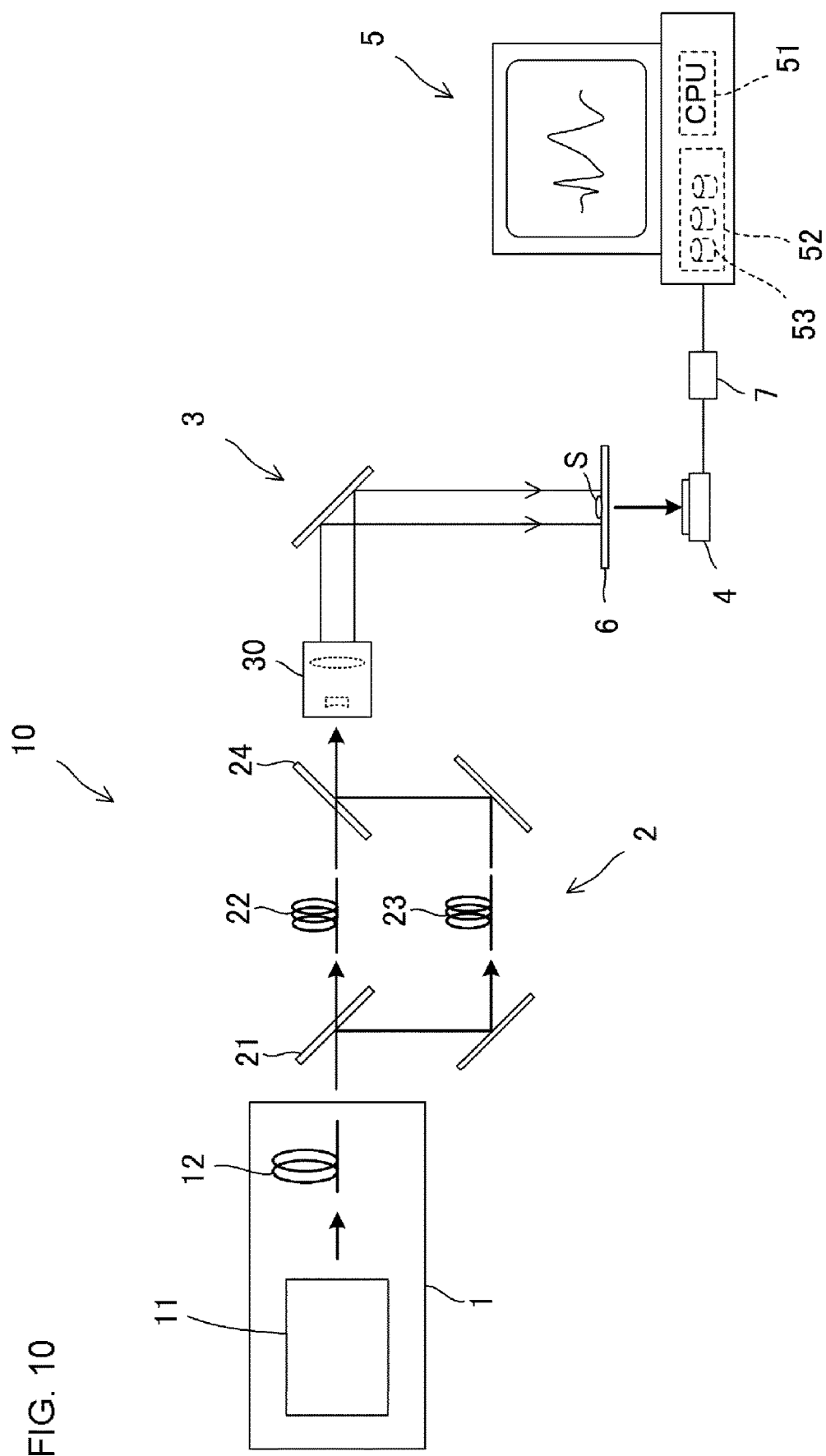
FIG. 10 is a schematic diagram of the spectroscopic measurement apparatus of a first embodiment.

FIG. 10 is a schematic diagram of the spectroscopic measurement apparatus of the first embodiment. The spectroscopic measurement apparatus shown in FIG. 10 includes a broadband pulsed light source apparatus 10, an irradiation optical system 3 that irradiates an object S with broadband pulsed light emitted from the broadband pulsed light source apparatus 10, a light receiver 4 disposed at a position where light from the object S irradiated with the broadband pulsed light is incident, and a calculator 5 that converts an output signal from the light receiver 4 into a spectrum.

The broadband pulsed light source apparatus 10 of the above embodiment is adopted. The irradiation optical system 3 includes a beam expander 30 in this embodiment. The light from the broadband pulsed light source apparatus 10 is broadband pulsed light stretched in time, but is light from the ultrashort pulse laser 11, and is in consideration of a small beam diameter. In addition, a scanning mechanism such as a galvanometer mirror may be provided to cover a wide irradiation region by beam scanning.

The light receiver 4 converts the intensity of the received light into an electric signal and outputs the signal. As the light receiver 4, a photodetector such as a photodiode having sensitivity in a measurement wavelength range is used. In this embodiment, it is assumed to measure an absorption spectrum of the object S, and thus the light receiver 4 is provided at a position where the transmitted light from the object S is incident. A transparent receiving plate 6 on which the object S is disposed is provided. The irradiation optical system 3 emits light from the upper side, and the light receiver 4 is disposed below the receiving plate 6.

As the calculator 5, a general-purpose PC is used in this embodiment. An AD converter 7 is provided between the light receiver 4 and the calculator 5, and an output of the light receiver 4 is input to the calculator 5 via the AD converter 7.

The calculator 5 includes a processor 51 and a storage (hard disk, memory, etc.) 52. In the storage 52, a measurement program 53 that processes an output signal from the light receiver 4 to calculate an absorption spectrum and other necessary programs are installed.

In this embodiment, since the broadband pulsed light source apparatus 10 that radiates the stretched pulsed light with the uniqueness of wavelength to time secured is used, the measurement program 53 is optimized accordingly. FIG. 11 is a diagram schematically showing a main part of an example of a measurement program included in the spectroscopic measurement apparatus of the first embodiment.

The example of FIG. 11 is an example of a program in which the measurement program 53 measures an absorption spectrum (spectral absorption rate). In the calculation of the absorption spectrum, reference spectrum data is used. The reference spectrum data is a value for each wavelength serving as a reference for calculating the absorption spectrum. The reference spectrum data is acquired by causing the light from the broadband pulsed light source apparatus 10 to be incident on the light receiver 4 without passing through the object S. That is, the light is directly incident on the light receiver 4 without passing through the object S, the output of the light receiver 4 is input to the calculator 5 via the AD converter 7, and a value for each time resolution Δt is acquired. Each value is stored as a reference intensity ($V_1$, $V_2$, $V_3$, ... ) at each time ($t_1$, $t_2$, $t_3$, ... ) for each Δt. The time resolution Δt is an amount determined by a response speed (signal discharge cycle) of the light receiver 4, and means a time interval during which a signal is output.

The reference intensities $V_1$, $V_2$, $V_3$, ... at the times $t_1$, $t_2$, $t_3$, ... are intensities (spectra) of the corresponding wavelengths $\lambda_1$, $\lambda_2$, $\lambda_3$, The relationships between the times $t_1$, $t_2$, $t_3$, ... and the wavelengths in one pulse are examined in advance, and it is handled that the values $V_1$, $V_2$, $V_3$, ... at the times are values of $\lambda_1$, $\lambda_2$, $\lambda_3$, ....

Then, when the light having passed through the object S is incident on the light receiver 4, the output from the light receiver 4 similarly passes through the AD converter 7 and is stored in the memory as the value, i.e. measurement value ($V_1, V_2, V_3, \ldots$) of each of the times $t_1, t_2, t_3, \ldots$. Each measurement value is compared with the reference spectrum data ($v_1/V_1, v_2/V_2, v_3/V_3, \ldots$) and the result is the absorption spectrum (taking the logarithm of the inverse as appropriate). The measurement program 53 is programmed so as to perform the arithmetic processing as described above.

Next, the operation of the spectroscopic measurement apparatus of the first embodiment will be described. The following description is also a description of the spectroscopic measurement method of the first embodiment. In the case of performing spectroscopic measurement using the spectroscopic measurement apparatus of the first embodiment, the broadband pulsed light source apparatus 10 is operated in a state where the object S is not disposed, light that does not pass through the object S is directly incident on the light receiver 4, and an output signal from the light receiver 4 is processed to acquire reference spectrum data in advance. Then, the object S is disposed on the receiving plate 6, and the broadband pulsed light source apparatus 10 is operated again. Then, the light transmitted through the object S is caused to be incident on the light receiver 4, and the output signal from the light receiver 4 is input to the calculator 5 via the AD converter 7, and is converted into a spectrum by the measurement program 53.

In the above example, the absorption spectrum is measured using the transmitted light from the object S, but a reflection spectrum (spectral reflectance) in which the reflected light from the object S is received by the light receiver 4 or the spectral characteristic such as internal scattered light of the object S may be measured. That is, the light from the object S may be transmitted light, reflected light, scattered light, or the like from the object S irradiated with light.

When the characteristic of the broadband pulsed light source apparatus 10 and the sensitivity characteristic of the light receiver 4 change with time, measurement for acquiring the reference spectrum (measurement in a state where the object S is not disposed) is performed, and calibration work for updating the reference spectrum is periodically performed.

According to the spectroscopic measurement apparatus and the spectroscopic measurement method of the first embodiment as described above, since the light from the broadband pulsed light source 1 is temporally divided and radiated to the object S, a time-consuming operation such as sweeping of the diffraction grating is unnecessary, and spectroscopic measurement at high speed can be performed. Then, when pulse stretching with the uniqueness of wavelength to time secured is performed, since the pulse stretching is performed separately by the two stretching fibers 22 and 23, an unintended nonlinear optical effect is not generated even though the object is irradiated with light with high illuminance, and the uniqueness of wavelength to time is maintained high. Therefore, spectroscopic measurement with high accuracy can be performed.

Furthermore, since the two stretching fibers 22 and 23 have different dispersion characteristics, a difference in wavelength resolution in a necessary wavelength range can be suppressed to be small. Therefore, the performance of the spectroscopic measurement apparatus is excellent. At this time, since beams of the two broadband pulsed light are prevented from temporally overlapping with each other, there is no problem that the uniqueness of wavelength to time is lost.

The point that the object can be irradiated with light with high illuminance is particularly advantageous when an absorption spectrum of an object having a large amount of absorption is measured.

Figure 12:
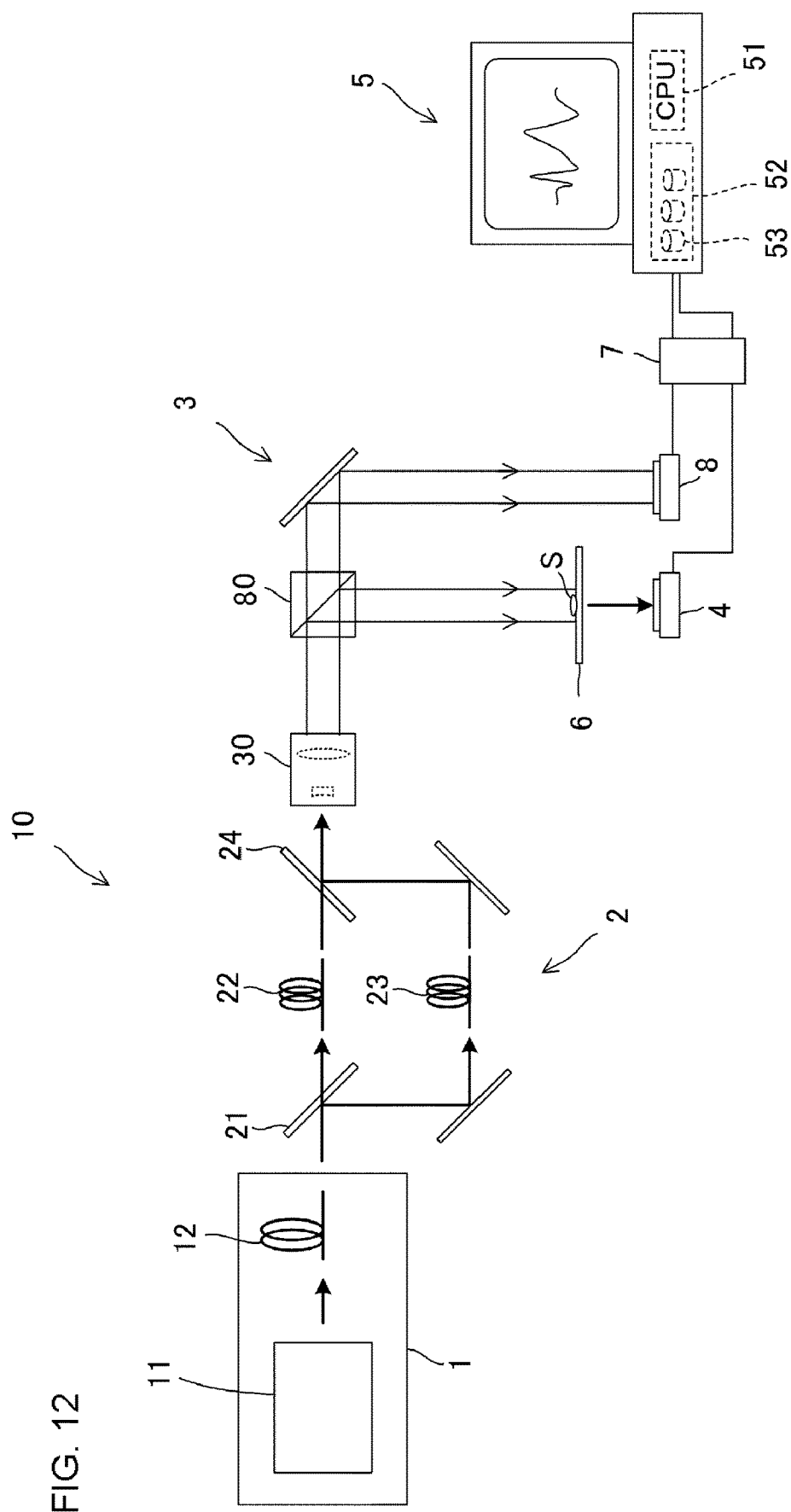
FIG. 12 is a schematic diagram of a spectroscopic measurement apparatus of a second embodiment.

Next, a spectroscopic measurement apparatus and a spectroscopic measurement method of a second embodiment will be described. FIG. 12 is a schematic diagram of the spectroscopic measurement apparatus of the second embodiment.

As shown in FIG. 12, the spectroscopic measurement apparatus of the second embodiment is provided with a branching element 80 that branches an optical path from the broadband pulsed light source apparatus 10. As the branching element 80, a beam splitter is used in this embodiment.

The branching element 80 branches the optical path from the broadband pulsed light source apparatus 10 into a measurement optical path and a reference optical path. In the measurement optical path, as is similar to the first embodiment, the receiving plate 6 is disposed, and the measurement light receiver 4 is disposed at a position on the receiving plate 6 where the light transmitted through the object S is received.

A reference light receiver 8 is disposed on the reference optical path. Light that is branched by the branching element 80 and travels through the reference optical path is incident on the reference light receiver 8 as it is. The light (reference light) is incident on the reference light receiver 8 without passing through the object S to obtain reference spectrum data in real time.

The measurement light receiver 4 and the reference light receiver 8 are connected to the calculator 5 via the AD converter 7. The measurement program 53 in the calculator 5 is programmed to perform real-time reference intensity spectrum reference. That is, the measurement values $v_1, v_2, v_3, \ldots$ at the times $t_1, t_2, t_3, \ldots$ are input from the measurement light receiver 4, and the reference intensities $V_1, V_2, V_3, \ldots$ (reference spectrum data) at the times $t_1, t_2, t_3, \ldots$, which are the same times, are input from the reference light receiver 8. The measurement program 53 calculates $v_1/V_1, v_2/V_2, v_3/V_3, \ldots$ according to the relationships between the times $t_1, t_2, t_3$, and the wavelengths $\lambda_1, \lambda_2, \lambda_3, \ldots$ in one pulse examined in advance, and sets the calculated $v_1/V_1, v_2/V_2, v_3/V_3, \ldots$ as an absorption spectrum. The reflection spectrum and the scattering spectrum can be measured similarly by reference spectrum data acquired in real time.

In the spectroscopic measurement method of the second embodiment using the spectroscopic measurement apparatus of the second embodiment, since the reference spectrum data is acquired in real time, the reference spectrum data is not periodically acquired. This embodiment is the same as the first embodiment except for this point.

According to the spectroscopic measurement apparatus and the spectroscopic measurement method of the second embodiment, it is unnecessary to separately acquire the reference spectrum data, so that the efficiency of the entire measurement work is increased. In addition, in the first embodiment, in a case where the characteristic of the broadband pulsed light source apparatus 10 and the characteristic of the light receiver 4 are likely to change, it is necessary to frequently perform calibration work, but it is unnecessary in the second embodiment. Even if the characteristic of the broadband pulsed light source apparatus 10 and the characteristic of the light receiver 4 do not change, in a case where the measurement environment is different (for example, in a case where the temperature condition, the condition of background light, and the like are different), calibration work may be required. In the second embodiment, since calibration work is unnecessary even in such a case, measurement efficiency is high. However, in the second embodiment, since the light flux from the broadband pulsed light source apparatus 10 is divided into two, the light flux that can radiate the object S is reduced by that amount. Therefore, in a case where it is necessary to perform measurement by irradiating the object S with broadband pulsed light with higher illuminance, the first embodiment is more advantageous.

Next, a spectroscopic measurement apparatus and a spectroscopic measurement method of a third embodiment will be described.

Figure 13:
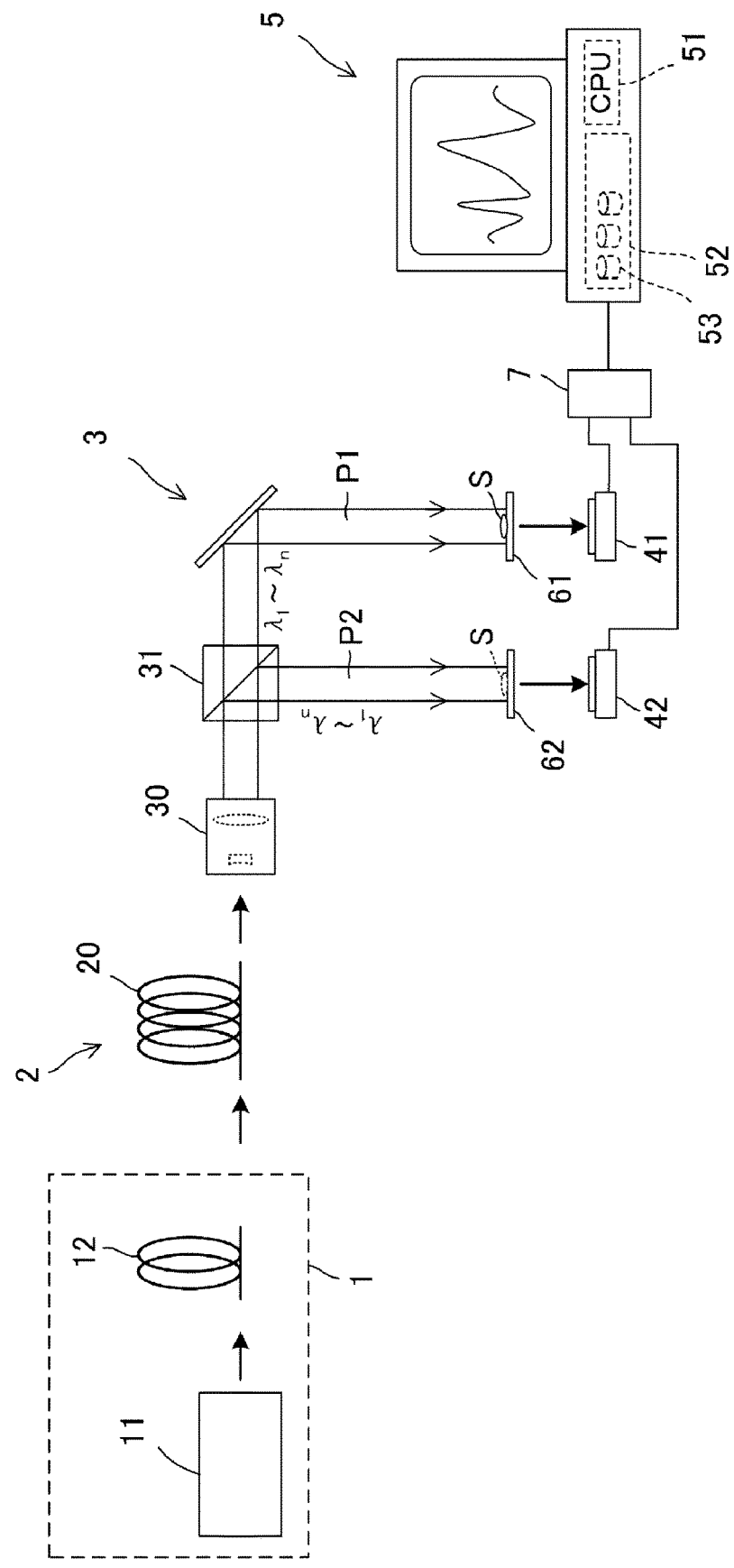
FIG. 13 is a schematic diagram of a spectroscopic measurement apparatus of a third embodiment.

FIG. 13 is a schematic diagram of the spectroscopic measurement apparatus of the third embodiment. As shown in FIG. 13, the spectroscopic measurement apparatus of the third embodiment also includes the broadband pulsed light source 1 and a stretching element 20 that stretches the pulse width of the broadband pulsed light from the broadband pulsed light source 1, and is a device that performs spectroscopic measurement by irradiating the object S with the broadband pulsed light in which the relationship between the time and the wavelength in the pulse is one-to-one.

In the third embodiment, as shown in FIG. 13, two light receivers 41 and 42 are provided. In addition, two receiving plates 61 and 62 are provided corresponding to the two light receivers 41 and 42. Each of the light receivers 41 and 42 is provided at a position on each of the receiving plates 61 and 62 where the transmitted light of the object S is received.

In the spectroscopic measurement apparatus of the embodiment as described above, the entire spectroscopic measurement system is optimized in consideration of the characteristic of the stretching element 20 and the characteristic of the light receivers 41 and 42. Specifically, the spectroscopic measurement system in the device of the embodiment is a system that divides the broadband pulsed light into two and individually detects the broadband pulsed light, and two different detection systems of a first detection system and a second detection system are provided.

More specifically, as shown in FIG. 13, the irradiation optical system 3 includes a dividing element. As the dividing element, a beam splitter 31 is used in this embodiment. The beam splitter 31 is a ½ split mirror and is an element that divides light into ½ light fluxes.

Since the beam splitter 31 as the dividing element is disposed, as shown in FIG. 13, the optical path from the stretching element 20 is branched into a first optical path P1 and a second optical path P2. Then, the receiving plates 61 and 62 are provided on the optical paths P1 and P2, respectively, and the light receivers 41 and 42 are disposed on emission sides of the receiving plates 61 and 62, respectively.

The irradiation optical system 3 includes the beam expander 30 in this embodiment. The light from the fiber as the stretching element 20 is broadband pulsed light stretched in time, but is light from the ultrashort pulse laser source 11, and is in consideration of a small beam diameter. In addition, a scanning mechanism such as a galvanometer mirror may be provided to cover a wide irradiation region by beam scanning.

In this embodiment, the light receivers 41 and 42 having different spectral sensitivity characteristics are adopted as components of different detection systems. That is, the light receivers 41 and 42 having different spectral sensitivity characteristics according to the measurement wavelength region are used. Assuming that the light receivers 41 and 42 are a first light receiver 41 and a second light receiver 42, the first light receiver 41 has higher spectral sensitivity than the second light receiver 42 in a first wavelength range, and the second light receiver 42 has higher spectral sensitivity than the first light receiver 41 in a second wavelength range different from the first wavelength range. As an example, as the first light receiver 41, an InGaAs diode light receiver adopting an InGaAs diode as a light receiving cell can be used, and as the second light receiver 42, a Si diode light receiver adopting a Si diode as a light receiving cell can be used.

Figure 14:
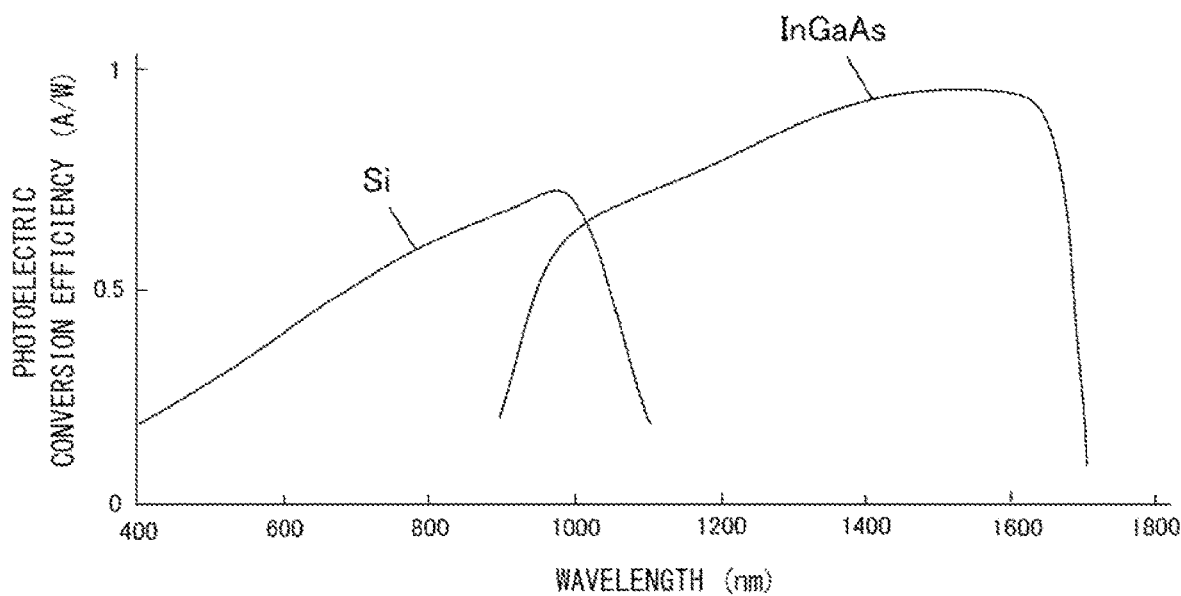
FIG. 14 is a schematic diagram showing an example of a spectral sensitivity characteristic of each light receiver in the third embodiment.

FIG. 14 is a schematic diagram showing an example of a spectral sensitivity characteristic of each light receiver in the third embodiment. In the example of FIG. 14, similarly, the spectral sensitivity characteristic of the InGaAs diode light receiver as the first light receiver 41 and the spectral sensitivity characteristic of the Si diode light receiver as the second light receiver 42 are shown. As shown in FIG. 14, the InGaAs diode light receiver has good sensitivity in a range of about 1000 to 1700 nm, and the Si diode light receiver has good sensitivity in a range of about 500 to 1000 nm.

The spectroscopic measurement apparatus of the embodiment includes the two different detection systems in consideration of the transmission characteristic of the fiber used as the stretching element 20 and the sensitivity characteristic of the light receiver itself. This point will be described below.

Figure 15:
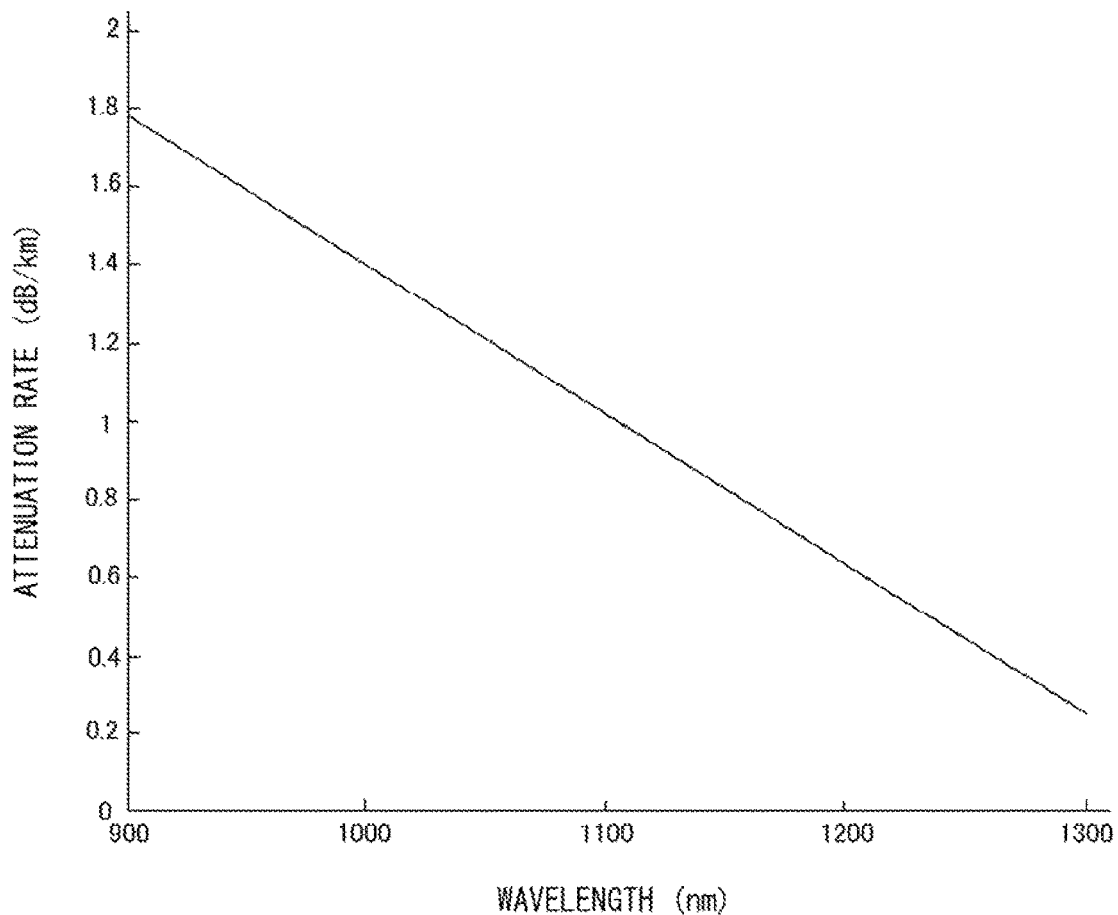
FIG. 15 is a diagram showing a transmission characteristic of a certain fiber used as a stretching element in the third embodiment.

FIG. 15 is a diagram showing a transmission characteristic of a certain fiber used as the stretching element 20 in the third embodiment. The fiber having the transmission characteristic shown in FIG. 15 is a silica-based single-mode fiber having a positive dispersion characteristic. In FIG. 15, the horizontal axis represents a wavelength, and the vertical axis represents an attenuation rate (dB) per 1 km. As shown in FIG. 15, this fiber has a transmission characteristic in which the attenuation rate increases as the wavelength decreases.

On the other hand, when the fiber is used as the stretching element 20 as in the embodiment, a certain length is required. This is because the gradient ($\Delta\lambda/\Delta t$ shown in FIG. 2) in the uniqueness of wavelength to time needs to be gentle to some extent. This is because if the gradient is strong, the wavelength resolution is lowered due to the relationship with the response speed (signal discharge cycle) of the light receiver. In order to make the gradient $\Delta\lambda/\Delta t$ gentle, it is necessary to increase the stretching amount, and for this purpose, it is necessary to lengthen the fiber.

However, as can be seen from FIG. 15, if the fiber is lengthened, the attenuation of light increases, and the attenuation amount particularly increases on the short wavelength side. That is, when the fiber is lengthened to increase the wavelength resolution, the attenuation increases particularly on the short wavelength side. As a result, even if the broadband pulsed light source 1 emits broadband pulsed light having a flat intensity characteristic between wavelengths, the intensity balance between the wavelengths may be deteriorated due to the decrease in the intensity in the short wavelength region after the pulse stretching.

In addition, as another problem, there is a circumstance that it is difficult for the light receiver to have a uniform sensitivity characteristic for broadband light. For example, in the case of performing spectroscopic measurement in the near-infrared range, the InGaAs diode light receiver adopting InGaAs as the light receiving cell can be suitably used. However, in the case of attempting to perform spectroscopic measurement over a wide band from the visible range to the near-infrared range, the InGaAs diode light receiver does not have sufficient sensitivity in a short wavelength region of less than 900 nm as shown in FIG. 14.

In the spectroscopic measurement apparatus of the third embodiment, the detection system is divided into two wavelength bands in consideration of the above, and an optimal light receiver is used for each wavelength band. That is, as described above, the InGaAs diode light receiver is used as the first light receiver 41 in the first wavelength range (long wavelength region), and the Si diode light receiver is used as the second light receiver 42 in the second wavelength range (short wavelength region). As shown in FIG. 14, the Si diode light receiver has good sensitivity in a short wavelength region of up to about 1050 nm, and even if the intensity decreases in the short wavelength region due to attenuation in the fiber as the stretching element 20, a sufficient photoelectric conversion output can be obtained, and spectroscopic measurement in this wavelength region can be performed without any trouble.

Figure 16:
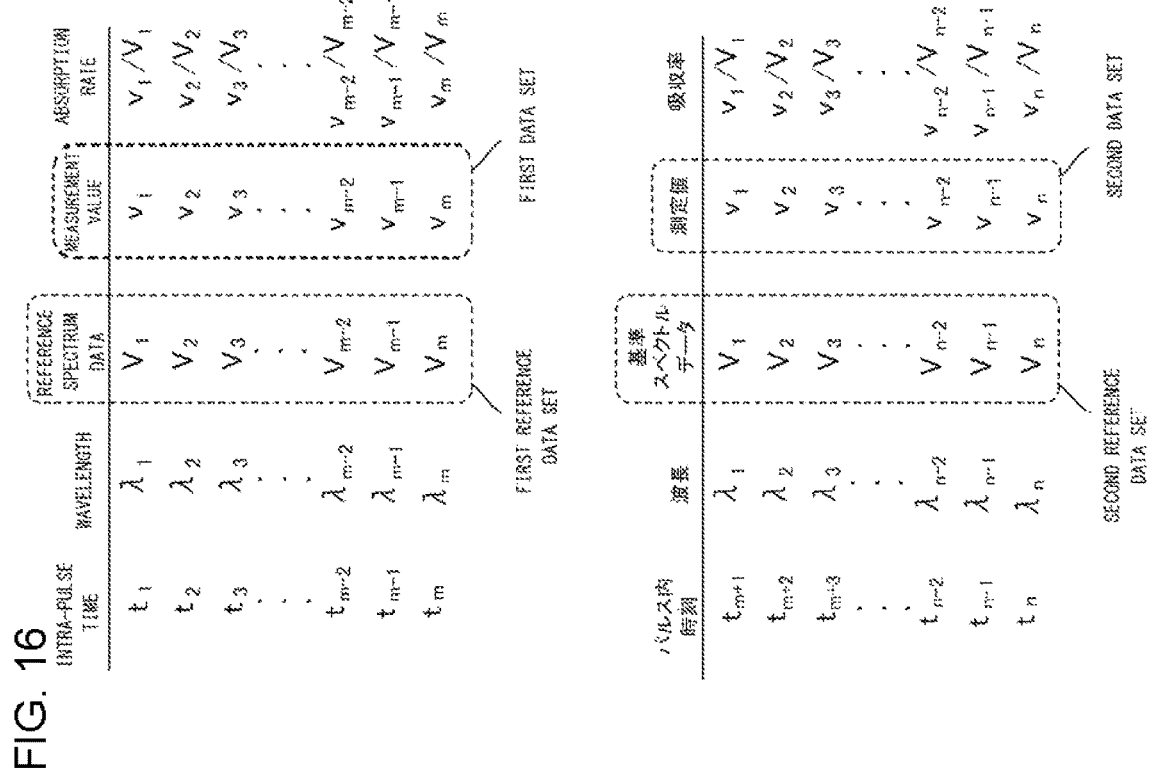
FIG. 16 is a schematic diagram showing data handled by the measurement program in the third embodiment.

Next, the measurement program 53 implemented in the calculator 5 will be described. FIG. 16 is a schematic diagram showing data handled by the measurement program 53 in the third embodiment, and FIG. 17 is a flowchart showing a schematic diagram of the measurement program 53 in the third embodiment.

Figure 17:
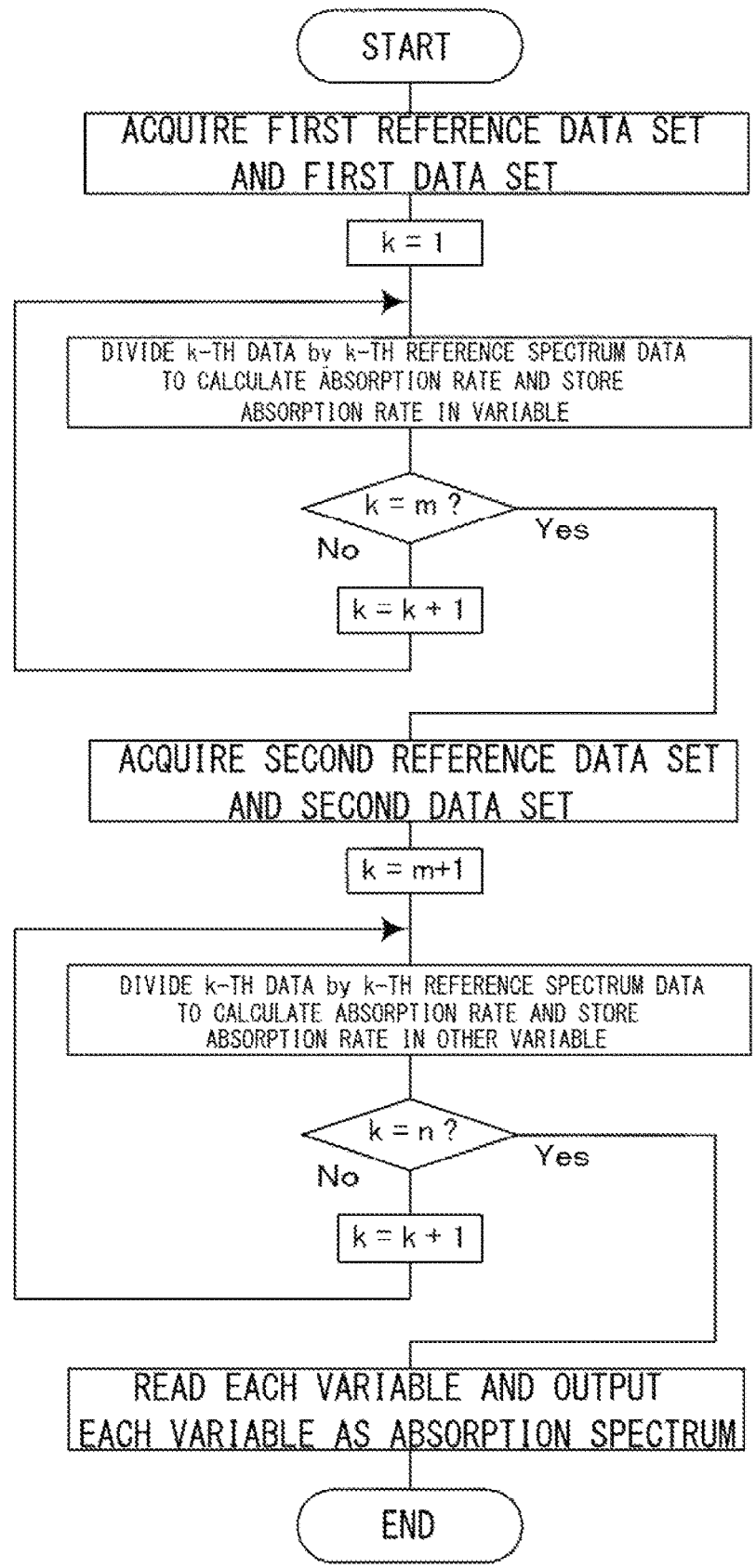
FIG. 17 is a flowchart showing a schematic diagram of the measurement program in the third embodiment.

The examples of FIGS. 16 and 17 are examples of a program in which the measurement program 53 measures an absorption spectrum (spectral absorption rate) as a spectral characteristic. As described above, the output from each of the light receivers 41 and 42 is input to the calculator 5 via the AD converter 7. This is a collection of data (photoelectric conversion value) for each signal discharge cycle in each of the light receivers 41 and 42, and is a data set. Hereinafter, a data set input from the first light receiver 41 via the AD converter 7 is defined as a first data set, and a data set input from the second light receiver 42 via the AD converter 7 is defined as a second data set.

As described above, the first light receiver 41 is for measurement in the first wavelength range, and the second light receiver 42 is for measurement in the second wavelength range. Hereinafter, for convenience of description, the first wavelength range is defined as $\lambda_1$ to $\lambda_m$. The second wavelength range is defined as $\lambda_{m+1}$ to $\lambda_n$.

In the calculation of the absorption spectrum, reference spectrum data is used. The reference spectrum data is a value for each wavelength serving as a reference for calculating the absorption spectrum. The reference spectrum data is acquired in advance by causing the broadband pulse stretching light to be incident on each of the light receivers 41 and 42 without passing through the object S. That is, the light is directly incident on each of the light receivers 41 and 42 without passing through the object S, and the output of each of the light receivers 41 and 42 is similarly input via each AD converter 7. Hereinafter, the data set input in this manner is referred to as a first reference data set and a second reference data set. Each reference data set is recorded in a file, and each file is stored in the storage 52.

Each reference data set has a reference intensity ($V_1$, $V_2$, $V_3$, ...) at each time $t_1$, $t_2$, $t_3$, ... for each time resolution $\Delta t$. The time resolution $\Delta t$ is a response speed (signal discharge cycle) of the detector 5, and is a time interval during which a signal is output. Hereinafter, the first reference data set is a reference data set for the first wavelength range, and has reference intensities $V_1$, $V_2$, $V_3$, ..., $V_m$ at times $t_1$ to $t_m$. The second reference data set is a reference data set for the second wavelength range, and has reference intensities $V_{m+1}$, $V_{m+2}$, $V_{m+3}$, ..., $V_n$ at times $t_{m+1}$ to $t_n$.

For the first reference data set, the relationships between times $t_1$, $t_2$, $t_3$, ..., and $t_m$ and the wavelengths in one pulse are examined in advance, and it is handled that values $V_1$, $V_2$, $V_3$, ..., and $V_m$ at the times are light intensities at $\lambda_1$, $\lambda_2$, $\lambda_3$, ..., and $\lambda_m$. The same applies to the second reference data set, and it is handled that values $V_{m+1}$, $V_{m+2}$, $V_{m+3}$, ..., and $V_n$ at the times in one pulse are light intensities at $\lambda_{m+1}$, $\lambda_{m+2}$, $\lambda_{m+3}$, ..., and $\lambda_n$.

As shown in FIG. 17, the measurement program 53 first acquires each of the first data set and the first reference data set from the file. Then, each measurement value in the first data set is compared with each reference value in the first reference data set ($v_1/V_1$, $v_2/V_2$, $v_3/V_3$, ..., $v_m/V_m$), and the result is temporarily stored in a variable (array variable).

Next, the measurement program 53 acquires each of the second data set and the second reference data set from the file. Then, each measurement value in the second data set is compared with each reference value in the second reference data set ($v_{m+1}/V_{m+1}$, $v_{m+2}/V_{m+2}$, $v_{m+3}/V_{m+3}$, ..., $v_n/V_n$), and the result is temporarily stored in another variable (array variable).

Next, the measurement program 53 acquires a calculation result from each variable, and regards the calculation result as a calculation result of an absorption spectrum $S_A$ as a continuous calculation result. That is, $v_1/V_1$ is an absorption rate at $\lambda_1$, $v_2/V_2$ is an absorption rate at $\lambda_2$, ..., and $v_m/V_m$ is an absorption rate at $\lambda_m$. In addition, $v_{m+1}/V_{m+1}$ is an absorption rate at $\lambda_{m+1}$, $v_{m+2}/V_{m+2}$ is an absorption rate at $\lambda_{m+2}$, ..., and $v_n/V_n$ is an absorption rate at $\lambda_n$. If necessary, the logarithm of each inverse is taken as the absorption rate. As a result, absorption rates of $\lambda_1$ to $\lambda_n$, that is, the absorption spectrum $S_A$ is obtained. The measurement program 53 ends with the obtained absorption spectrum $S_A$ as an execution result of the program.

The operation of the spectroscopic measurement apparatus of the third embodiment as described above will be described below. The following description is also a description of the spectroscopic measurement method of the third embodiment.

First, the object S is placed on the first receiving plate 61, and the broadband pulsed light source 1 is operated. In the broadband pulsed light source 1, the ultrashort pulsed light from the ultrashort pulse laser source 11 is incident on the nonlinear element 12, is broadened by the nonlinear optical effect, and is emitted as broadband pulsed light. The broadband pulsed light is incident on the stretching element 20, and the pulse width is stretched by the stretching element 20.

The pulsed light having the stretched pulse width is divided by the beam splitter 31 as the dividing element, one light travels along the first optical path P1, and the other light travels along the second optical path P2. The light traveling along the first optical path P1 is radiated to the object S. Then, the light transmitted through the object S is incident on the first light receiver 41. The output from the first light receiver 41 is input to the calculator 5 via the AD converter 7, temporarily recorded in the file, and stored in the storage 52.

Next, the operation of the broadband pulsed light source 1 is temporarily stopped, and the object S (the object S measured by the light traveling through the first optical path P1) is transferred to the second receiving plate 62 (for example, transferred by hand by a measurer). In this state, the broadband pulsed light source 1 is operated again. Similarly, the broadband pulsed light is stretched by the stretching element 20 and divided by the beam splitter 31 as the dividing element. This time, the other light traveling through the second optical path P2 is radiated to the object S, and the light transmitted through the object S is received by the second light receiver 42. The output of the second light receiver 42 is input to the calculator 5 via the AD converter 7. Then, similarly, it is temporarily recorded in the file and stored in the storage 52.

In this way, when the detection of the transmitted light by the two detection systems is completed, the measurement program 53 operates, and the absorption spectrum is calculated as described above. The calculated absorption spectrum is appropriately displayed on a display or the like.

In the above operation, the output from the first light receiver 41 includes the values $V_{m+1}$ to $V_n$ from $t_{m+1}$ to $t_n$, and the output from the second light receiver 42 includes the values $v_1$ to $v_m$ from $t_1$ to $t_m$, which are not included in the final measurement result. However, for the output data from the second light receiver 42, it is necessary to specify the time of $t_1$ (rise of pulse) in specifying the time of $t_{m+1}$. In that part, data at a time before $t_{m+1}$ is also used for measurement. That is, the spectrum is obtained with the time of $t_1$ as a reference, up to the time of $t_{m+1}$, which has elapsed from the time of $t_1$, as the intensity of the wavelength of $\lambda_{m+1}$. The same applies to $\lambda_{m+2}$ and the subsequent values.

According to the spectroscopic measurement apparatus and the spectroscopic measurement method of the third embodiment as described above, in the spectroscopic measurement using the uniqueness of wavelength to time of the pulse-stretched broadband pulsed light, the detection system is divided into the two detection systems, so that the detection of light in each wavelength region can be optimized according to the characteristic of the stretching element 20 and the characteristic of the light receivers 41 and 42. Therefore, a spectroscopic measurement apparatus and a spectroscopic measurement method capable of performing spectroscopic measurement at high speed with sufficient accuracy over a wide wavelength band are provided.

In the above embodiment, the configuration in which the detection system is divided into the two detection systems is adopted, but it is a matter of course that the detection system may be divided into three or more detection systems.

Since the above operation and method are structured to perform measurement by selectively using any of the detection systems, it is preferable to adopt a configuration to cancel measurement in an unselected detection system. For example, each of the receiving plates 61 and 62 may be provided with a sensor that detects whether or not the object S is placed, and in a case where the object S is not placed, there may be a configuration in which the output of the corresponding light receiver 41 or 42 is not input to the calculator 5 (or is canceled even if being input). Alternatively, a shutter may be appropriately provided in each detection system, and light may not be incident on the light receiver 41 or 42 by the shutter in a detection system that is not used.

In the third embodiment, the wavelength band of the broadband pulsed light from the broadband pulsed light source 1 and the total sensitive wavelength band of the two light receivers 41 and 42 extend over the near-infrared range of 900 to 1300 nm. This point has significance that the object S is a solid phase or a liquid phase and is suitable for analyzing the object S by absorption. Many materials have an absorption wavelength in the band of 900 to 1300 nm, and it is particularly effective to widely cover this band by the two detection systems for spectroscopic analysis of the object S such as a solid phase or a liquid phase. For example, the spectroscopic measurement apparatus and the spectroscopic measurement method of the embodiment can be used for analysis of a drug (tablet or the like).

In the above description, it has been described that spectroscopic measurement is performed with broadband pulsed light of one pulse emitted from the broadband pulsed light source 1, but in practice, spectroscopic measurement is often performed with a plurality of pulses of broadband pulsed light. In this case, each data set is a plurality of data sets, and the spectrum is calculated by averaging the measurement values of each data set.

In the above example, the absorption spectrum is measured as the spectral characteristic, but other spectra such as a reflection spectrum and a scattering spectrum may be used. In the case of measuring the reflection spectrum, the light receivers 41 and 42 are disposed at positions where the reflected light from the object S is received, and in the case of measuring the scattering spectrum, the light receivers 41 and 42 are disposed at positions where the scattered light is received.

Figure 18:
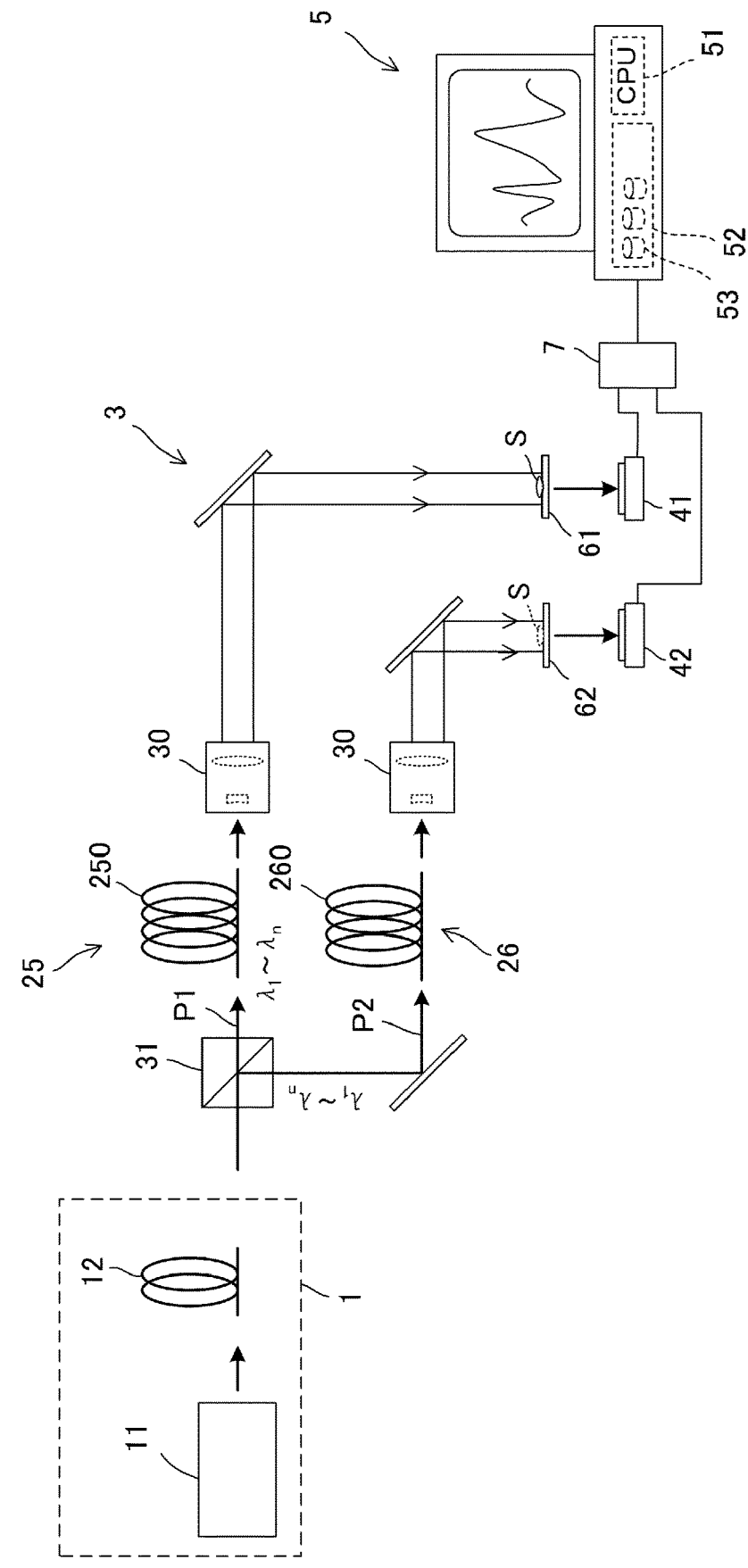
FIG. 18 is a schematic diagram of a spectroscopic measurement apparatus of a fourth embodiment.

Next, a spectroscopic measurement apparatus and a spectroscopic measurement method of a fourth embodiment will be described. FIG. 18 is a schematic diagram of the spectroscopic measurement apparatus of the fourth embodiment.

Also in the fourth embodiment, the two first and second detection systems are provided. The fourth embodiment is different from the third embodiment in that the dividing element is provided on the optical path in front of the stretching element, and as a result, two first and second stretching elements 25 and 26 are provided. Also in this embodiment, the beam splitter 31 is used as the dividing element.

The incident end of the fiber (hereinafter, a first fiber) 250 as the first stretching element 25 is disposed on the optical path P1 of one light transmitted through the beam splitter 31, and the incident end of the fiber (hereinafter, a second fiber) 260 as the second stretching element 26 is disposed on the optical path P2 of the other light reflected by the beam splitter 31. The first receiving plate 61 is disposed at an irradiation position of the light emitted from the first fiber 250, and the second receiving plate 62 is disposed at an irradiation position of the light emitted from the second fiber 260. Further, as is similar to the third embodiment, the first light receiver 41 is disposed on the emission side of the first receiving plate 61, and the second light receiver 42 is disposed on the emission side of the second receiving plate 62.

The difference between the third embodiment and the fourth embodiment is whether the light is wavelength-divided after the pulse stretching or the light is wavelength-divided before the pulse stretching, and the third embodiment and the fourth embodiment are basically the same in other parts. One light transmitted through the beam splitter 31 as the dividing element is transmitted by the first fiber 250, the pulse width thereof is stretched, and then the object S is irradiated with the light. Then, the light transmitted through the object S is detected by the first light receiver 41. In addition, the other light reflected by the beam splitter 31 is transmitted by the second fiber 260, the pulse width thereof is stretched, and then the object S is irradiated with the light. Then, the light transmitted through the object S is detected by the second light receiver 42. Then, the output from each of the light receivers 41 and 42 is input to the calculator 5 via the AD converter 7, and the spectrum is calculated by the measurement program 53.

The configuration of the fourth embodiment can be said to be a configuration in which a pulse stretching element is incorporated in each detection system. This configuration has an advantage that an optimal stretching element can be adopted according to the characteristic of the detection system. That is, the pulse stretching can be optimized as a whole by appropriately using the stretching elements 25 and 26 having different dispersion characteristics to obtain desired dispersion. For example, the first fiber 250 and the second fiber 260 to be used may have different group dispersion characteristics. Further, the first fiber 250 and the second fiber 260 to be used may have different lengths.

In a more preferable configuration, in the pulse stretching shown in FIG. 2, the slope ($\Delta\lambda/\Delta t$) of wavelength to time after stretching is desirably constant over the entire wavelength region. This is because the time and the wavelength can be easily associated with each other and the calculation accuracy of the spectrum can be enhanced. In this case, in the fibers 250 and 260 used as the stretching elements 25 and 26, for example, the magnitude of the delay is often different depending on the wavelength even if the dispersion is the same positive. For this reason, pulse stretching is performed by different fibers in a first detection system including the first light receiver 41 and intended for measurement of the first wavelength range and a second detection system including the second light receiver 42 and intended for measurement of the second wavelength range, and the respective delay amounts are optimized. As a result, $\Delta\lambda/\Delta t$ after the pulse stretching can be made uniform as a whole. The configuration of the fourth embodiment has an advantage as compared with that of the third embodiment in that such a configuration is possible.

However, since two stretching elements are required, the cost is high in that respect. Conversely, the third embodiment in which wavelength division is performed after pulse stretching is performed is more advantageous in terms of cost.

Figure 19:
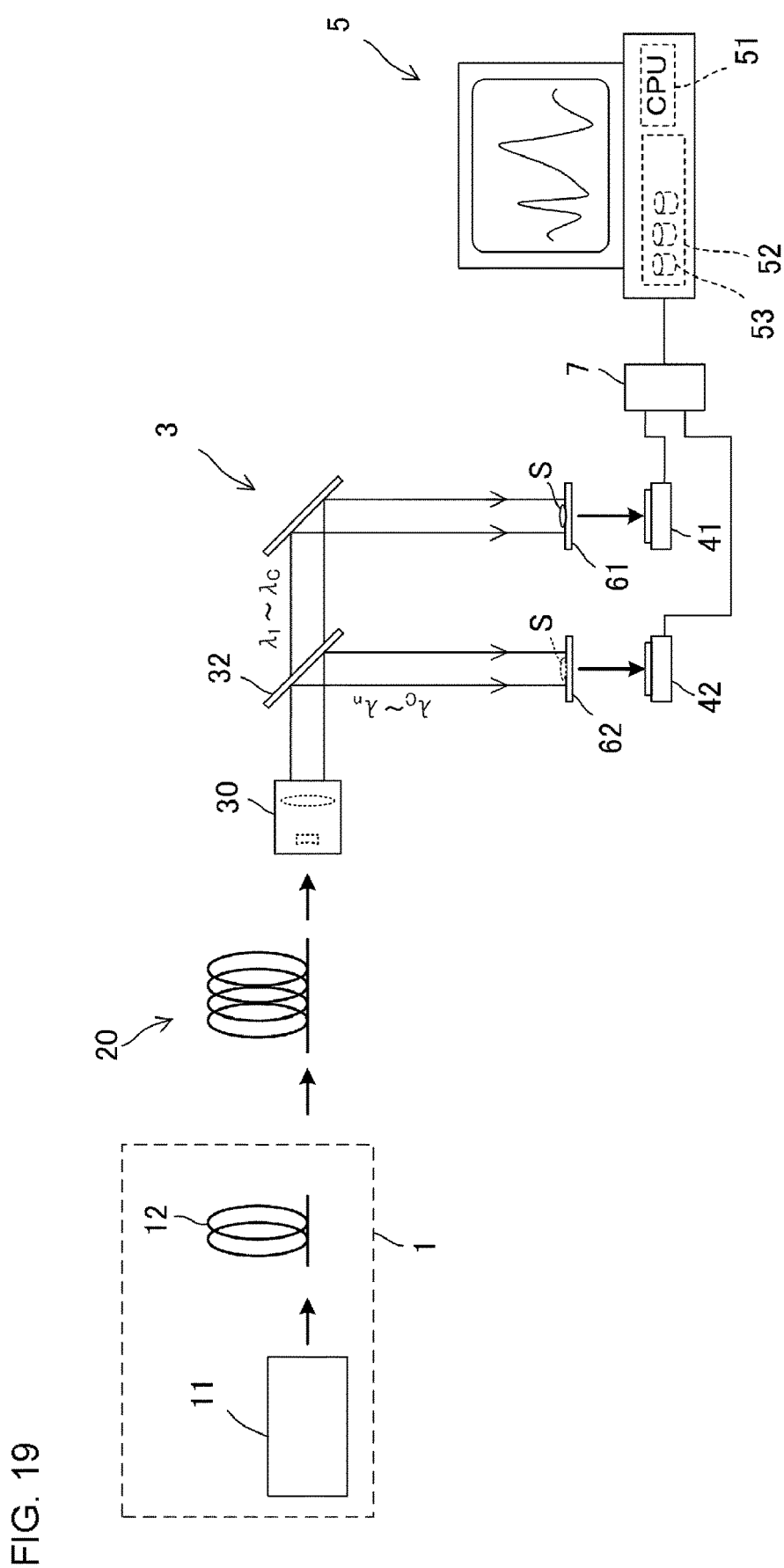
FIG. 19 is a schematic diagram of a spectroscopic measurement apparatus of a fifth embodiment.

Next, a fifth embodiment will be described. FIG. 19 is a schematic diagram of a spectroscopic measurement apparatus of the fifth embodiment.

In the fifth embodiment, a dichroic mirror 32 is used as the dividing element instead of the beam splitter 31 in the configuration of the third embodiment. Other configurations are the same as those of the third embodiment.

Figure 20:
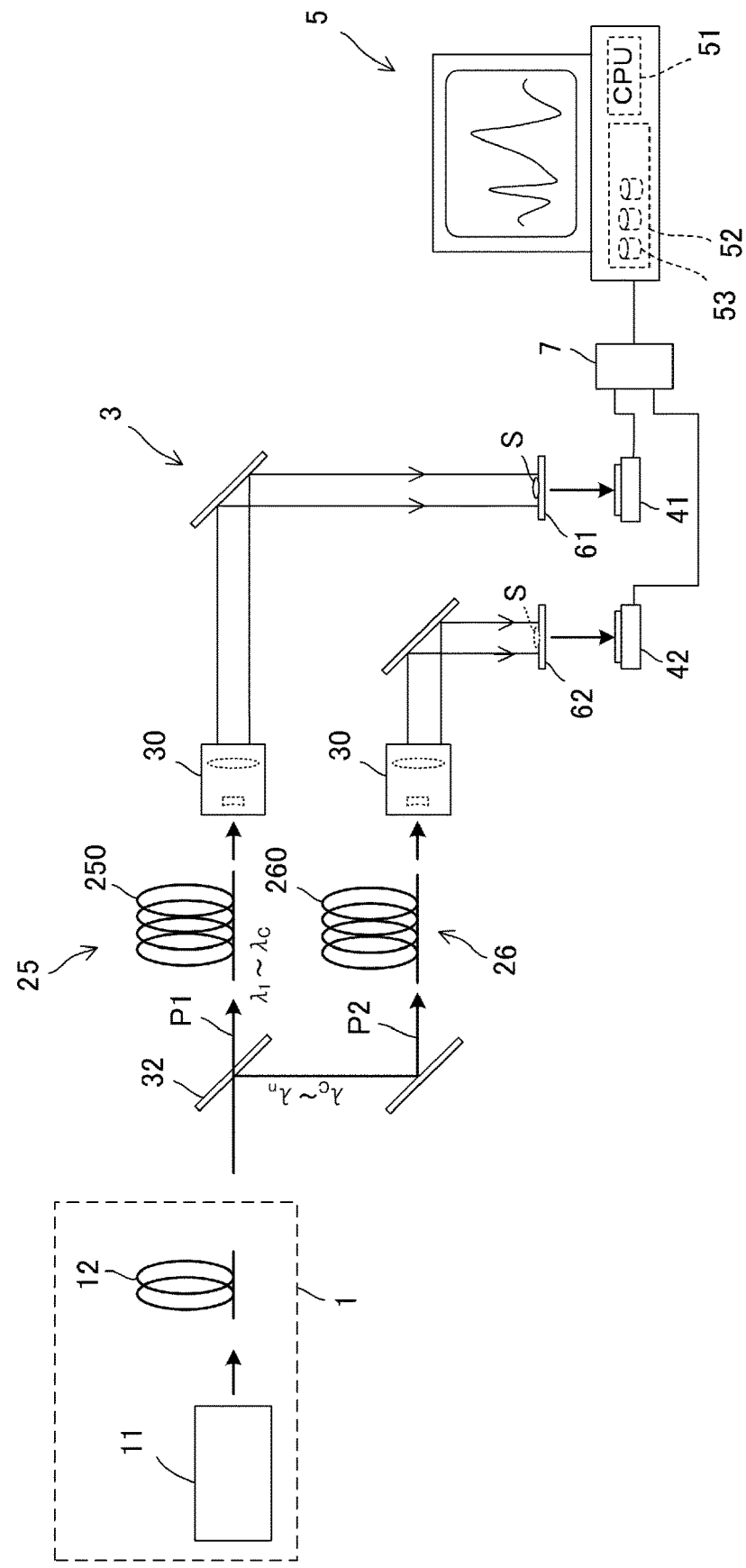
FIG. 20 is a schematic diagram of a spectroscopic measurement apparatus of a sixth embodiment.

The dichroic mirror 32 is an element that divides light into two light beams according to the wavelength. For example, as shown in FIG. 20, one that transmits light having a wavelength longer than a division wavelength $\lambda_c$ and reflects light having a wavelength shorter than $\lambda_c$ is used. The first light receiver 41 is disposed on the first optical path P1 for a long wavelength, and the second light receiver 42 is disposed on the second optical path P2 for a short wavelength.

In this embodiment, the light is divided by the dividing element according to the wavelength, and the detection system is different for each wavelength range. Therefore, when the detection system is optimized according to the wavelength range, the loss can be reduced, and the spectroscopic measurement apparatus is more suitable in this respect. This point will be described below.

In the third embodiment, the light is divided into two by the beam splitter 31 without being particularly divided according to the wavelength, and is received by the first and second light receivers 41 and 42 via the objects S. Among the outputs from the first and second light receivers 41 and 42, a wavelength range having higher spectral sensitivity is selected and converted into a wavelength as a measurement result. In this configuration, a wavelength range having low spectral sensitivity is not used for measurement, which is a loss in a certain sense.

On the other hand, in the fifth embodiment, since the dichroic mirror 32 that divides light according to the wavelength is used as the dividing element, if the division wavelength $\lambda_c$ is appropriately selected according to the spectral sensitivity characteristics of the first and second light receivers 41 and 42, there is no loss when a wavelength range having higher spectral sensitivity is selected and converted into a wavelength. Therefore, a spectroscopic measurement apparatus and a spectroscopic measurement method capable of performing spectroscopic measurement at high speed with sufficient accuracy and efficiency over a wide wavelength band are provided.

The division wavelength can be a boundary wavelength between the first wavelength range and the second wavelength range in the third embodiment. That is, when the InGaAs diode light receiver and the Si diode light receiver are used as described above, both have sensitivity in a range of about 900 to 1100 nm (sensitive wavelength regions overlap). Therefore, the division wavelength is selected within this range, and can be set to, for example, about 1050 nm. That is, the dichroic mirror 32 as the dividing element may be a mirror that transmits light of 1050 nm or more and reflects light of less than 1050 nm.

The configuration of the calculator 5 is basically similar to the configurations of the third and fourth embodiments, but processing of output data from the second light receiver 42 is slightly different. In the third and fourth embodiments, the time of $t_1$ (rise of pulse) in the output data of the second light receiver 42 is used as a reference to specify the time $t_{m+1}$ of the first wavelength $\lambda_{m+1}$ in the processing of the output data from the second light receiver 42. In the fifth embodiment, the light having the wavelength of $\lambda_1$ corresponding to $t_1$ does not enter the second light receiver 42. The light having the first wavelength incident on the second light receiver 42 is light having a wavelength (hereinafter, referred to as a division reference wavelength) closest to $\lambda_c$ among the light beams shorter than $\lambda_c$ and having the effective intensity (for example, an intensity of 5% or more with respect to the peak of the pulse). The time of the division reference wavelength becomes a reference time in the processing of the output data from the second light receiver 42, and the intensity of the light having each wavelength is acquired by the elapsed time for each $\Delta t$ with respect to the reference time. The division reference wavelength is checked in advance, and the time when the effective intensity of the output data from the second light receiver 42 is first observed is defined as the time of the division reference wavelength. Thereafter, the intensity of each wavelength is defined by the correspondence relationship for each $\Delta t$.

Next, a sixth embodiment will be described. FIG. 20 is a schematic diagram of a spectroscopic measurement apparatus of the sixth embodiment.

The spectroscopic measurement apparatus of the sixth embodiment has a configuration in which the dichroic mirror 32 is used as the dividing element instead of the beam splitter 31 in the configuration of the fourth embodiment. Other configurations are the same as those of the fourth embodiment.

Similarly, the dichroic mirror 32 is an element that divides the broadband pulsed light into two light beams according to the wavelength, and as shown in FIG. 20, an element that transmits light having a wavelength longer than the division wavelength and reflects light having a wavelength shorter than the division wavelength is used. Then, the incident end of the first fiber 250 as the first stretching element 25 is disposed on the first optical path P1 for a long wavelength, and the incident end of the second fiber 260 as the second stretching element 26 is disposed on the second optical path P2 for a short wavelength. Similarly, the first light receiver 41 is disposed at a position where the light emitted from the first fiber 250 is received via the object S, and the second light receiver 42 is disposed at a position where the light emitted from the second fiber 260 is received via the object S.

Also in the sixth embodiment, since the light of $\lambda_1$ does not enter the second light receiver 42, similarly to the fifth embodiment, the division reference wavelength is examined in advance, and the time when the effective intensity is first observed is defined as the division reference wavelength. Thereafter, the intensity of light having each wavelength is acquired by the correspondence relationship for each $\Delta t$.

Also in the sixth embodiment, there is an advantage that an optimal stretching element can be adopted according to the characteristic of the detection system. That is, desired dispersion can be obtained and used by appropriately using the stretching elements 25 and 26 having different dispersion characteristics, and the pulse stretching can be optimized as a whole. At this time, since the dichroic mirror 32 that divides light according to the wavelength is used as the dividing element, it is possible to take an advantage of the characteristics of the stretching elements 25 and 26. As is similar to the fifth embodiment, there is no light that is not used for measurement, and a high-efficiency spectroscopic measurement apparatus and spectroscopic measurement method are obtained.

Figure 21:
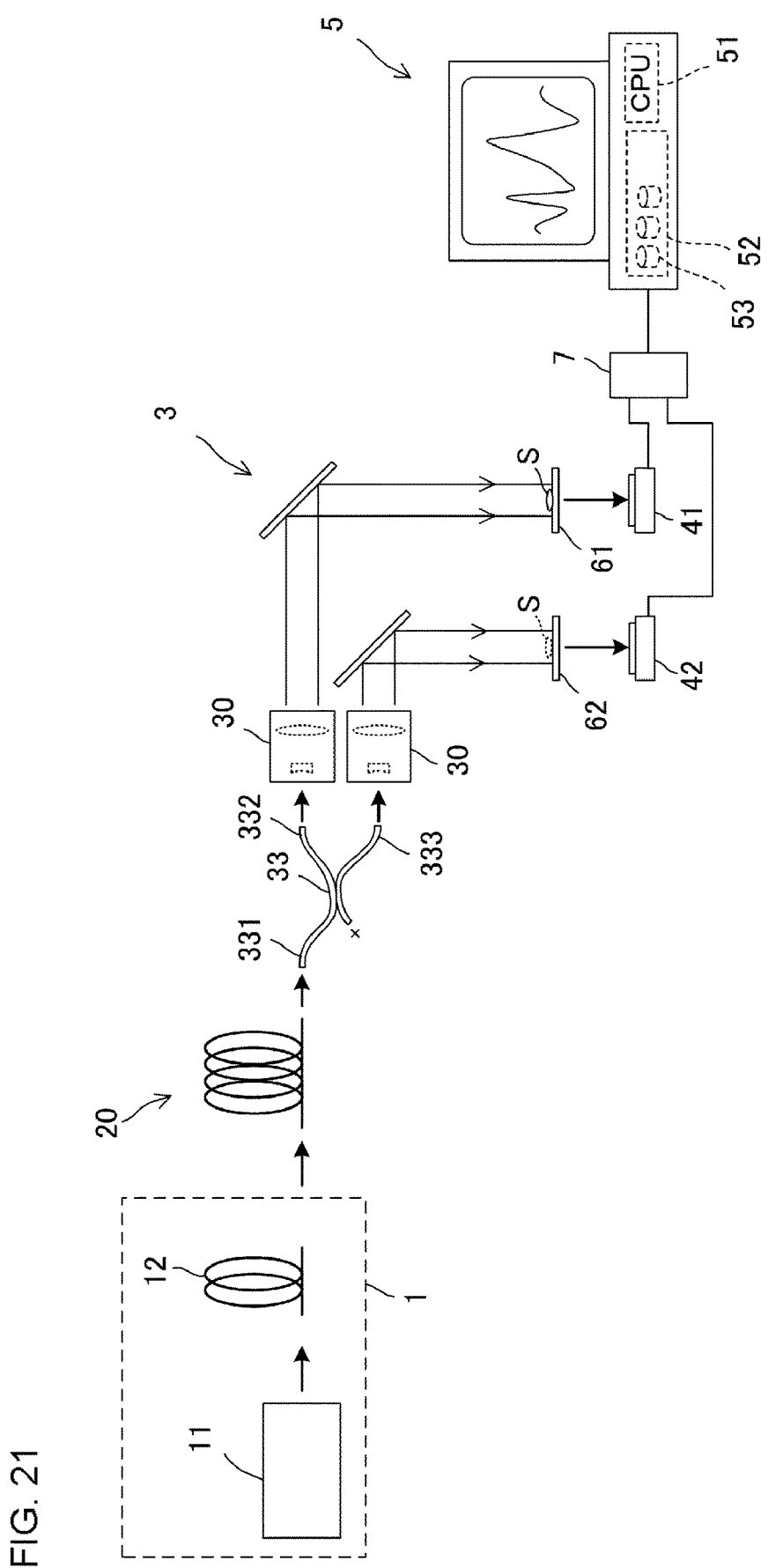
FIG. 21 is a schematic diagram of a spectroscopic measurement apparatus of a seventh embodiment.

Next, a seventh embodiment will be described. FIG. 21 is a schematic diagram of a spectroscopic measurement apparatus of the seventh embodiment.

In the seventh embodiment shown in FIG. 21, a wavelength division multiplexing (WDM) coupler 33 is used as a dividing element. Other configurations are the same as those of the fifth embodiment shown in FIG. 19.

In this embodiment, the WDM coupler 33 to be used is a fiber type, and is formed by fusing and stretching two single-mode or multimode fibers. As shown in FIG. 21, one end on the incident side is terminated, and light from the stretching element 20 is incident from the other incident end 331. Light having a wavelength longer than the division wavelength is emitted from one emission end 332 branched into two, and a wavelength shorter than the division wavelength is emitted from the other emission end 333.

In the seventh embodiment, since the fiber type WDM coupler 33 is used, it is preferable that a fiber is used as the stretching element 20 because mutual affinity is high. That is, since the fibers are connected to each other, connection and transmission can be performed with low loss by appropriately using a connector or the like, and a high-efficiency spectroscopic measurement apparatus can be obtained.

Similarly, when the object S is irradiated, the beam expander 30 is preferably provided, and the beam expanders 30 are provided on the emission side of the WDM coupler 33 as the dividing element as shown in FIG. 21.

In addition, the fiber type WDM coupler 33 can also be used as a dividing element in the sixth embodiment shown in FIG. 20. In this case, an emission end of a fiber as the nonlinear element 12 is connected to the incident end 331 of the WDM coupler 33. In addition, one 332 of the branched emission ends is connected to the first fiber 250, and the other 333 is connected to the second fiber 260. Also in this case, since the fibers are connected to each other, low-loss connection and transmission are performed, and a high-efficiency spectroscopic measurement apparatus can be obtained.

FIG. 22 is a schematic diagram showing an example of another dividing element.

As shown in FIG. 22, in addition to the above, a diffraction grating, an arrayed waveguide grating (AWG), or the like can be used as the dividing element.

For example, as shown in FIG. 22(1), light from the stretching element is wavelength-dispersed by diffraction gratings 35, and the light is condensed by lenses 363 according to the division wavelength to be incident on auxiliary fibers 361 and 362. The emission end of the first auxiliary fiber 361 is disposed to irradiate the object S on the first receiving plate 61 with light, and the emission end of the second auxiliary fiber 362 is disposed to irradiate the object S on the second receiving plate 62 with light. At this time, each of the auxiliary fibers 361 and 362 can be a fiber for pulse stretching (first and second fibers 250 and 260).

Furthermore, as shown in FIG. 22(2), an AWG 37 can be used as a dividing element. The AWG 37 is configured by forming functional waveguides 372 to 376 on a substrate 371. The functional waveguides include a large number of arrayed waveguides 372 having optical path lengths slightly different from each other, slab waveguides 373 and 374 connected to both ends (incident side and emission side) of the arrayed waveguides 372, an incident-side waveguide 375 that causes light to be incident on the incident-side slab waveguide 373, and emission-side waveguides 376 that extract light having each wavelength from the emission-side slab waveguide 374.

The slab waveguides 373 and 374 are free spaces, and light incident through the incident-side waveguide 375 spreads in the incident-side slab waveguide 373 and is incident on each arrayed waveguide 372. Since the lengths of the arrayed waveguides 372 are slightly different from each other, the phases of the light beams reaching the ends of the arrayed waveguides 372 are shifted by the difference. The light is diffracted and emitted from each arrayed waveguide 372, but the diffracted light beams pass through the emission-side slab waveguide 374 while interfering with each other and reach the incident ends of the emission-side waveguides 376. At this time, the interference light has the highest intensity at a position corresponding to the wavelength due to the phase shift. That is, the light beams having different wavelengths are sequentially incident on the emission end waveguides 376, and the light is spatially dispersed. Strictly speaking, each of the emission-side waveguides 376 is formed such that each incident end is located at such a position that the light is dispersed in such a manner.

Two auxiliary fibers 377 and 378 are connected to the emission-side waveguides 376 according to the division wavelength. That is, the first auxiliary fiber 377 is connected to the emission-side waveguides 376 that emit a wavelength longer than the division wavelength, and the second auxiliary fiber 378 is connected to the emission-side waveguides 376 that emit a wavelength shorter than the division wavelength. A lens (not shown) is interposed or a fan-in/fan-out device is used to connect the auxiliary fibers 377 and 378. Also in this case, each of the auxiliary fibers 377 and 378 irradiates the object S on each of the receiving plates 61 and 62 with light, and can be similarly a fiber for pulse stretching.

Also in the examples of FIGS. 22(1) and (2), since the affinity with the fiber is high, it is possible to easily perform connection to the fiber as the nonlinear element 12 with low loss, and it is possible to obtain a high-efficiency spectroscopic measurement apparatus.

Figure 23:
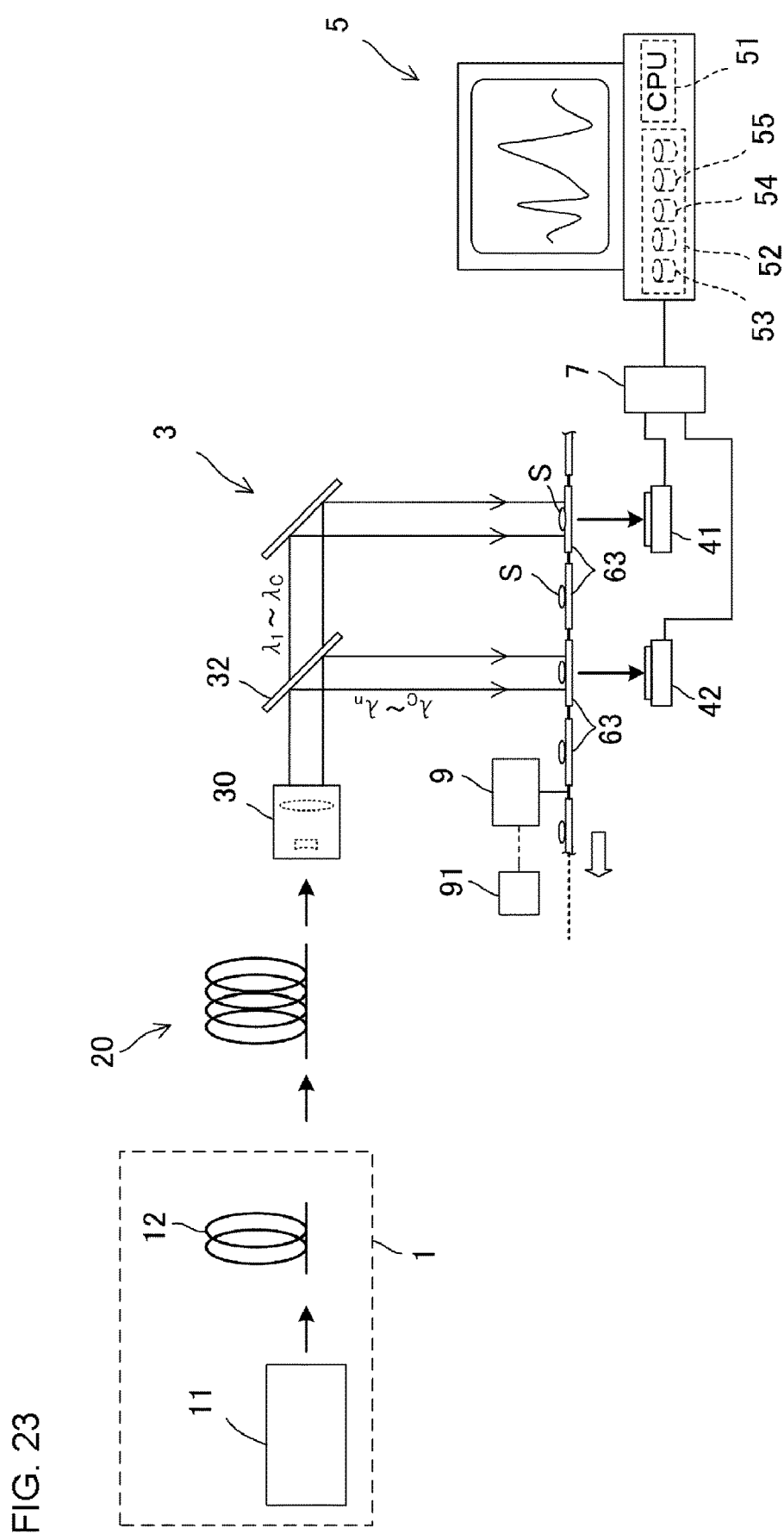
FIG. 23 is a schematic diagram of a spectroscopic measurement apparatus of an eighth embodiment.

Next, an eighth embodiment will be described. FIG. 23 is a schematic diagram of a spectroscopic measurement apparatus of the eighth embodiment.

In the fifth embodiment described above, it is assumed that the transfer of the object S from the first receiving plate 61 to the second receiving plate 62 is performed by a measurer, but a transfer mechanism such as a robot may be separately provided and the transfer may be automatically performed. The eighth embodiment is an embodiment obtained by modifying the fifth embodiment from such a viewpoint.

In this embodiment, since the measurement in the first detection system and the measurement in the second detection system are continuously performed at high speed, a moving mechanism 9 that moves the object S is provided. Specifically, in this embodiment, a large number of receiving plates 63 are provided in a row in the horizontal direction. The moving mechanism 9 is a mechanism that linearly moves the receiving plates 63 in the direction in which the receiving plates 63 are arranged (hereinafter, a moving direction). For example, when a horizontal direction perpendicular to the moving direction is left and right, a configuration in which a linear guide is provided on one of the left and right sides and a linear drive source such as a linear motor is provided on the other side may be adopted. The receiving plates 63 are connected to each other and linearly move by the linear drive source while being guided by the linear guide.

In this embodiment, the receiving plate 63 is provided with a recess (not shown) so that the object S is not moved. Each object S is placed on each receiving plate 63 in a state of being dropped into the recess.

The moving mechanism 9 is provided with a controller 91. The controller 91 is structured to sequentially position the receiving plates 63 at the irradiation positions set above the light receivers 41 and 42. The controller 91 controls the receiving plates 63 to move integrally with respect to the linear drive source with a predetermined stroke. In the device, a position irradiated with light traveling through the first optical path P1 (hereinafter, a first irradiation position) and a position irradiated with light traveling through the second optical path P2 (hereinafter, a second irradiation position) are set, and the predetermined stroke is a separation interval between the first and second irradiation positions. The controller 91 receives a signal from the calculator 5. A sequence program 54 that operates each unit of the device including the controller 91 in a predetermined sequence is implemented in the calculator 5.

The spectroscopic measurement apparatus of the eighth embodiment as described above is suitable for use in sequentially performing spectroscopic measurement of a large amount of objects S at high speed. For example, the spectroscopic measurement may be performed during inspection of a product in a production line. A reference absorption spectrum in the case of a non-defective product is examined in advance, and an absorption spectrum of each product is obtained by spectroscopic measurement and compared with the reference absorption spectrum to determine the pass or fail of the product. The device of the eighth embodiment is suitably used for such an application. In this application, as shown in FIG. 23, a pass/fail determination program 55 is implemented in the calculator 5, and a file (not shown) recording the reference absorption spectrum is stored in the storage 52.

Specifically, each object S is dropped and held in the recess of each receiving plate 63. Then, the moving mechanism 9 sequentially moves the object S on each receiving plate 63 to the first irradiation position and the second irradiation position. Then, when the object S is positioned at the first irradiation position, the broadband pulsed light source 1 operates to irradiate the object S with light on the long wavelength side, and the transmitted light is received by the first light receiver 41. Then, the data set on the long wavelength side (first data set) for the object S is temporarily recorded in the file.

The receiving plate 63 then moves to the second irradiation position, and in this state, the broadband pulsed light source 1 operates to irradiate the object S with light on the short wavelength side. Then, the data set on the short wavelength side (second data set) for the object S is temporarily recorded in the file.

Thereafter, the measurement program 53 operates to calculate the absorption spectrum for the object S. Next, the pass/fail determination program 55 operates to perform pass/fail determination. That is, the calculated absorption spectrum is compared with the reference absorption spectrum, and it is determined whether the deviation falls within a predetermined range. If it is within the predetermined range, it is determined as pass, and if it is out of the range, it is determined as fail.

The moving mechanism 9 sequentially positions the object S on each receiving plate 63 at the first and second irradiation positions, and the object S is irradiated with light at each position to acquire the first and second data sets. Then, the measurement program 53 sequentially calculates the absorption spectrum, and the pass/fail determination program determines pass/fail. As a result of the pass/fail determination, inspection information of the product is stored in the storage 52. It is more preferable to provide an exclusion mechanism that excludes the product determined as fail from the manufacturing line and prevents the product from being shipped.

In the eighth embodiment, when the object S is placed at the second irradiation position and measurement is performed, the next object S is placed at the first irradiation position and measurement is performed simultaneously. That is, the first data set and the second data set are simultaneously acquired in one irradiation. In this case, the measurement program 53 in the calculator 5 is programmed so that the first data set in one irradiation and the second data set in the next irradiation are collectively used as the calculation result of the entire absorption spectrum for the object S. For each data set, an absorption spectrum may be calculated by being compared with the reference absorption spectrum, and then each data set may be put together, or each data set may be put together as an entire data set and then compared with the reference absorption spectrum to obtain a measurement result of the absorption spectrum.

The spectroscopic measurement apparatus and the spectroscopic measurement method of the eighth embodiment as described above can spectrally measure a large amount of objects S at high speed since the objects S are moved by the moving mechanism 9 and sequentially positioned at the first and second irradiation positions, and can be suitably used for such a necessary application.

In FIG. 23, the moving mechanism 9 is provided in the configuration of the fifth embodiment, but it is a matter of course that the moving mechanism 9 may be provided in the configuration of another embodiment such as the third embodiment.

Next, acquisition of the reference spectrum data will be supplementarily described.

As described above, when the spectral characteristic of the object S is calculated, the reference spectrum data is acquired in advance. In this case, the acquisition of the reference spectrum data (measurement in a state where the object S is not disposed) is periodically performed as the calibration work in consideration of the temporal characteristic change of the broadband pulsed light source 1 and each of the light receivers 41 and 42.

For more reliable spectroscopic measurement, it is preferable to obtain the reference spectrum data frequently. As a method for performing this without reducing the measurement efficiency, it is preferable that when a data set is acquired using one light receiver, the reference data set is acquired by the other light receiver. That is, in each of the third to seventh embodiments, when the object S is placed on the first receiving plate 61 and the first data set is acquired, since the object S is not placed on the second receiving plate 62, the reference spectrum data for the second light receiver 42 is acquired with the data output from the second light receiver 42 at this time. In addition, when the object S is placed on the second receiving plate 62 and the second data set is acquired by the output from the second light receiver 42, since the object S is not placed on the first receiving plate 61, the reference spectrum data for the first light receiver 41 is acquired with the data output from the first light receiver 41 at this time. In this way, acquisition of each reference data set can be frequently performed in a state temporally close to the actual measurement. Therefore, a more reliable spectroscopic measurement apparatus and spectroscopic measurement method are obtained.

Figure 24:
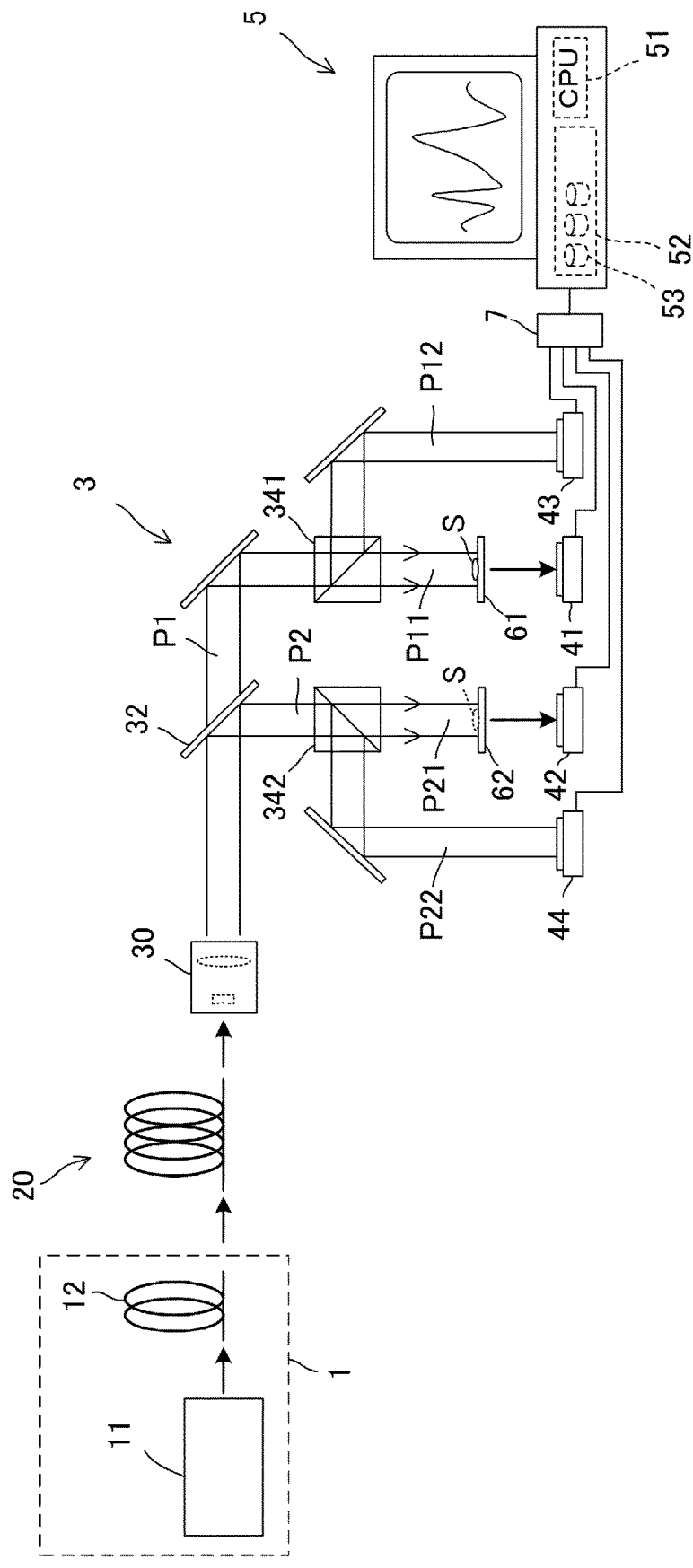
FIG. 24 is a schematic diagram of a spectroscopic measurement apparatus of a ninth embodiment.

Next, a spectroscopic measurement apparatus of a ninth embodiment will be described. FIG. 24 is a schematic diagram of the spectroscopic measurement apparatus of the ninth embodiment.

In order to further improve the reliability of the spectroscopic measurement, it is conceivable to perform acquisition of each data set and acquisition of each reference data set simultaneously (in real time). The ninth embodiment shown in FIG. 24 has this configuration.

The ninth embodiment shown in FIG. 24 is an embodiment in which real-time calibration is performed in the configuration of the fifth embodiment of FIG. 19. Specifically, the first and second optical paths P1 and P2 extending from the dichroic mirror 32 as the dividing element are respectively provided with first and second beam splitters 341 and 342 as branching elements.

The first beam splitter 341 further branches the first optical path P1 into two. Hereinafter, two optical paths P11 and P12 are referred to as a first measurement optical path and a first reference optical path. Similarly to the fifth embodiment, the first receiving plate 61 is disposed on the first measurement optical path P11, and the first light receiver 41 is disposed on the emission side thereof. A first reference light receiver 43 is disposed on the first reference optical path P12. No receiving plate is disposed on the first reference optical path P12, and the light is incident on the first reference light receiver 43 without passing through the object S.

The second beam splitter 342 further branches the second optical path P2 into two optical paths P21 and P22. Hereinafter, the two optical paths P21 and P22 are referred to as a second measurement optical path and a second reference optical path. Similarly, the second receiving plate 62 is disposed on the second measurement optical path P21, and the second light receiver 42 is disposed on the emission side thereof. A second reference light receiver 44 is disposed on the second reference optical path P22. No receiving plate is disposed on the second reference optical path P22, and the light is incident on the second reference light receiver 44 without passing through the object S.

The outputs from the respective light receivers 41 to 44 are input to the calculator 5 via the AD converter 7. The outputs from the respective light receivers 41 to 44 are recorded in different files as a first data set, a first reference data set, a second data set, and a second reference data set, and are temporarily stored in the storage 52. Then, the data sets are read by the measurement program 53 to acquire a spectrum. Since the measurement program 53 itself is similar to that described above, the description thereof is omitted.

In the ninth embodiment, one light beam divided by each of the beam splitters 341 and 342 is used for measurement, the other light beam is used for reference, and each reference data set is acquired in real time. For this reason, spectroscopic measurement with higher reliability can be performed.

Figure 25:
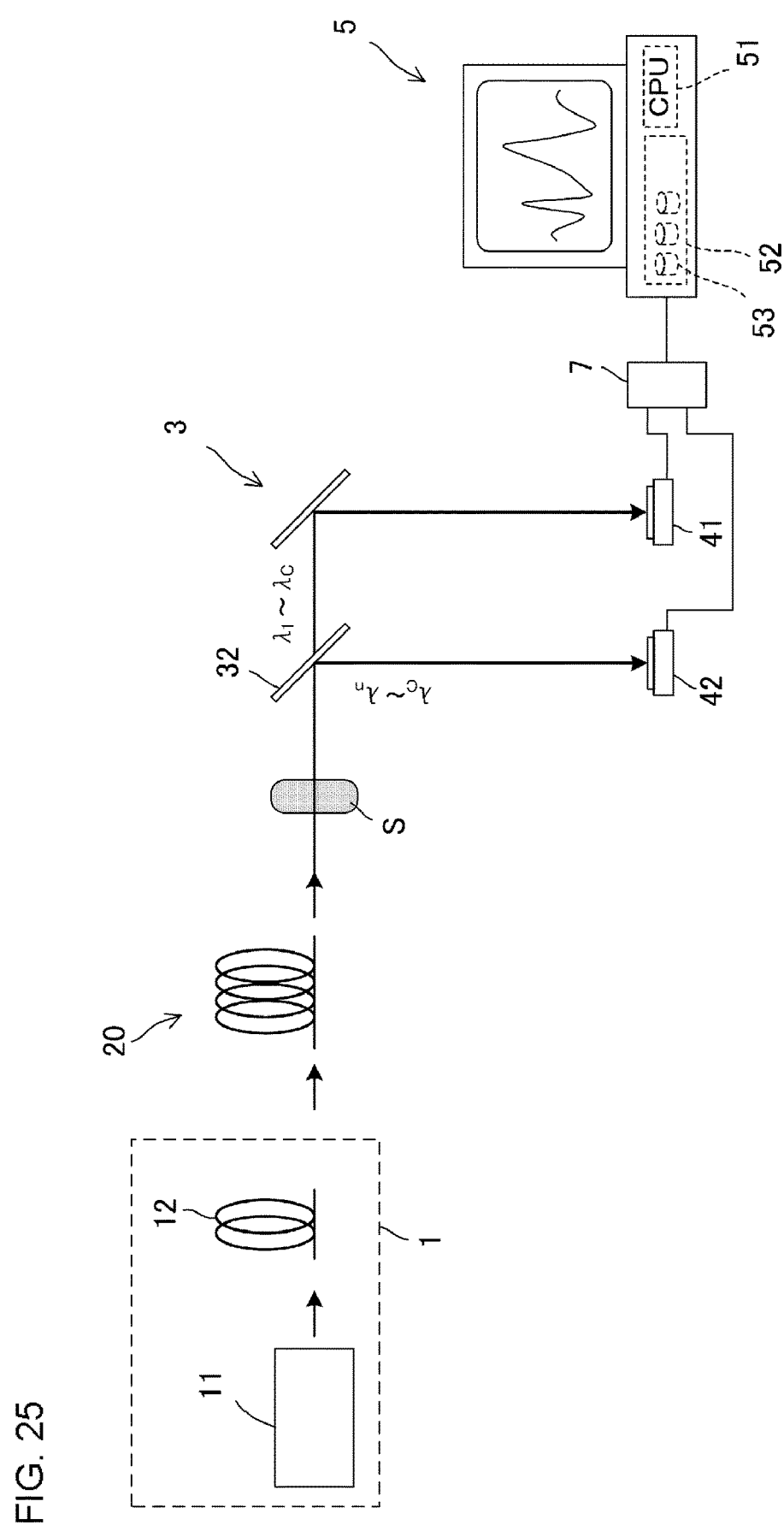
FIG. 25 is a schematic diagram of a spectroscopic measurement apparatus of a tenth embodiment.

Next, a tenth embodiment will be described. FIG. 25 is a schematic diagram of a spectroscopic measurement apparatus of the tenth embodiment.

The spectroscopic measurement apparatus of the tenth embodiment has a configuration obtained by modifying the fifth embodiment shown in FIG. 19. Specifically, in the spectroscopic measurement apparatus, a dividing element is disposed at a position where the light from the object S is divided, and the light from the object S is divided into two and received by the light receivers 41 and 42. In this embodiment, the dividing element is the dichroic mirror 32, but may be a beam splitter.

The light from the stretching element 20 is directly radiated to the object S as it is, and the light from the object S is divided by the dichroic mirror 32. Then, the divided light beam on the long wavelength side is received by the first light receiver 41, and the light beam on the short wavelength side is received by the second light receiver 42. The configuration of the calculator that processes the output data from each of the light receivers 41 and 42 to acquire the spectrum is similar to that of the fifth embodiment.

In the tenth embodiment, since the entire spectrum can be acquired only by irradiation of one pulse for one object S, spectroscopic measurement with higher accuracy can be performed in this respect. As in each of the above embodiments, in a case where spectroscopic measurement is performed by irradiating one object S with different pulses in the measurement of the first wavelength range and the measurement of the second wavelength range, if the reproducibility of the broadband pulsed light is lowered by any chance, the measurement accuracy is lowered. However, in the tenth embodiment, such a problem does not occur. Other embodiments other than the fifth embodiment can be modified in this manner.

In FIG. 25, the object S is assumed to be a liquid phase or a gas phase, and is put in a transparent cell and measured. Such a configuration may also be adopted in the first to ninth embodiments. In addition, in the tenth embodiment, it is of course possible to adopt a configuration in which a receiving plate in a horizontal posture is provided and light from an object on the receiving plate is divided. Since the light from the object S irradiated with the broadband pulsed light is divided by the dividing element, one receiving plate is sufficient. This makes the structure simpler.

Next, another example of the stretching element 20 will be described with reference to FIG. 26. FIG. 26 is a schematic diagram showing another example of the stretching element 20. As the stretching element 20, a single-mode multicore fiber, a single-mode bundle fiber, a multimode fiber, or the like can be used in addition to the single-mode fiber. Furthermore, the stretching element 20 can be configured using a diffraction grating, a chirped fiber Bragg grating (CFBG), a prism, or the like.

For example, as shown in FIG. 26(1), two diffraction gratings 27 are used to perform wavelength dispersion. At this time, an optical path difference is formed according to the wavelength, and pulse stretching is performed in a state where the uniqueness of wavelength to time is achieved. In this example, the longer the wavelength of light, the shorter the optical path. As described above, since the diffraction grating can be used as the dividing element, a configuration in which both pulse stretching and wavelength division are performed by the diffraction grating can also be adopted.

As shown in FIG. 26(2), it is also possible to perform pulse stretching using a CFBG 28. The FBG is a fiber in which a diffraction grating is configured by periodically providing a portion in which a refractive index changes in a length direction of a core, and specifically, the CFBG can be said to be a fiber in which a reflection position is set to a different position according to a wavelength so that a function of a chirp mirror is realized using the fiber. In the case of use as the stretching element 20, in the CFBG 28, a refractive index change layer in the core is formed such that, for example, light on a long wavelength side among the incident light beams is reflected and returned on the front side in the traveling direction in the fiber, and is reflected and returned on the back side as the light is on the short wavelength side. This configuration is equivalent to that of the normal dispersion fiber. Since the light returns with a delay on the shorter wavelength side, the uniqueness of wavelength to time is similarly secured.

Further, as shown in FIG. 26(3), prisms 29 may also be used for pulse stretching. In this example, four prisms (two pairs of prisms) 29 are used and disposed such that the optical path becomes longer toward the shorter wavelength side, thereby constituting the stretching element 20. Also in this example, since the light is emitted with a delay on the shorter wavelength side, the uniqueness of wavelength to time is secured.

In the examples of FIGS. 26(1) to (3), an optical path difference is formed when light is folded back. As a configuration for extracting light in the backward path, a configuration in which a combination of a polarizing beam splitter and a ¼ wavelength plate is disposed on an optical path in front of the stretching element 20 can be adopted. In the forward path, the light advances in the order of the polarization beam splitter and the ¼ wavelength plate and is incident on the stretching element 20, and in the backward path, the light returned from the stretching element 20 advances in the order of the ¼ wavelength plate and the polarization beam splitter.

In the third to tenth embodiments, the InGaAs diode light receiver is used in one detection system that detects light on the long wavelength side, and the Si diode light receiver is used in the other detection system that detects light on the short wavelength side. However, this is an example, and other types of light receivers can be used. For example, a CdS light receiver or the like can be used in the visible range, and a PbS light receiver, an InSb light receiver, or the like can be used in the near-infrared range.

The wavelength region of the spectroscopic measurement may also be a visible range or an infrared range longer than the near-infrared range.

In addition, the example, in which the broadband pulsed light source 1 is the SC light source, has been given, but other broadband pulsed light sources such as an amplified spontaneous emission (ASE) light source and a superluminescent diode (SLD) light source may be used.

In the third to tenth embodiments, it is not necessarily essential to include the dividing element. When there is no dividing element, the optical path is not divided into the first and second optical paths P1 and P2, so that the first and second detection systems are temporally divided. That is, two of first and second irradiation steps are performed on the object on the receiving plate. In each irradiation step, the receiving plate and the object are held at the same position, but in the first irradiation step, the first light receiver 41 is disposed at the light receiving position and measurement is performed, and in the second irradiation step, the second light receiver 42 is disposed at the light receiving position and measurement is performed. Similarly, the measurement program 53 calculates the spectrum based on the data set from each of the light receivers 41 and 42. A mechanism (for example, a mechanism such as a revolver) for exchanging the light receivers 41 and 42 may be provided.

In each embodiment, the receiving plates 61 to 63 are in a horizontal posture, and the object S is irradiated with light from the upper side. However, this is an example, and the object S may be irradiated with light from the side or may be irradiated with light obliquely.

Applications of the broadband pulsed light source apparatus include various light measurements in addition to the spectroscopic measurement described above. For example, it can be said that an application of observing an object by irradiating the object with light like a microscope is also a type of light measurement, and it can be said that a case of measuring a distance by irradiating the object with light is also a type of light measurement. The broadband pulsed light source apparatus of the invention of the present application can be used for such various light measurements.

The continuous spectrum over a certain wavelength width included in the wavelength range of 900 nm to 1300 nm has a meaning of being suitable for light measurement in the near-infrared range particularly effective for material analysis and the like. However, there are various spectroscopic measurements other than this wavelength range, and the spectroscopic measurement apparatus and the spectroscopic measurement method are not limited to this wavelength range.

In the first and second embodiments, the stretching module 2 is a module that performs pulse stretching using the two stretching fibers 22 and 23, but three or more stretching fibers may be used. The stretching fibers are disposed in parallel, and pulse-stretch the broadband pulsed light divided according to the wavelength.

The invention claimed is:

1. A broadband pulsed light source apparatus comprising:
   a broadband pulsed light source; and
   a stretching fiber module structured to stretch a pulse width of broadband pulsed light from the broadband pulsed light source such that an elapsed time and a wavelength of light in a pulse have a one-to-one relationship,
   wherein the stretching fiber module includes:
   a dividing element structured to spatially divide the broadband pulsed light from the broadband pulsed light source into two beams according to a wavelength range; and
   two stretching fibers having different wavelength dispersion characteristics per unit length, wherein an incident end of each of the two stretching fibers is disposed at a position where a corresponding one of the two beams having a corresponding wavelength range is incident, wherein each of the two stretching fibers has a wavelength dispersion characteristic and a length such that two beams of stretched pulsed light are emitted from the two stretching fibers, and the two beams of the stretched pulsed light do not temporally completely overlap with each other, and wherein the two stretching fibers have dispersion characteristics in which a/b is 2 or less, where a is a largest slope of wavelength to time and b is a smallest slope of wavelength to time in an entire wavelength band of the stretched broadband pulsed light.

2. A broadband pulsed light source apparatus comprising:
a broadband pulsed light source; and
a stretching fiber module structured to stretch a pulse width of broadband pulsed light from the broadband pulsed light source such that an elapsed time and a wavelength of light in a pulse have a one-to-one relationship, wherein the stretching fiber module includes:
a dividing element structured to spatially divide the broadband pulsed light from the broadband pulsed light source into two beams according to a wavelength range; and
two stretching fibers having different wavelength dispersion characteristics per unit length, wherein an incident end of each of the two stretching fibers is disposed at a position where a corresponding one of the two beams having a corresponding wavelength range is incident, wherein each of the two stretching fibers has a wavelength dispersion characteristic and a length such that two beams of stretched pulsed light are emitted from the two stretching fibers, and the two beams of the stretched pulsed light do not temporally completely overlap with each other, and wherein a time period in which the two beams of the stretched pulsed light do not temporally overlap with each other is 100 nm or more in a case of corresponding to a wavelength.

3. A spectroscopic measurement apparatus comprising:
a broadband pulsed light source;
a dividing element structured to divide broadband pulsed light emitted from the broadband pulsed light source into a long-wavelength pulse and a short-wavelength pulse with a division wavelength as a boundary;
a first stretching element that stretches a pulse width of the long-wavelength pulse so as to generate a first beam such that an elapsed time and the wavelength in a pulse have a one-to-one relationship;
a second stretching element that stretches a pulse width of the short-wavelength pulse so as to generate a second beam such that a relationship between an elapsed time and the wavelength in a pulse is one-to-one;
a first light receiver having a first sensitivity in a first wavelength range and structured to receive light from an object irradiated with the first beam;
a second light receiver having a second sensitivity in a second wavelength range which is different from the first wavelength range and structured to receive light from the object irradiated with the second beam, wherein the first light receiver and the second light receiver have different spectral sensitivity characteristics; and a calculator structured to convert a temporal change of an output from the first light receiver during a time period corresponding to the first wavelength range and a temporal change of an output from the second light receiver during a time period corresponding to the second wavelength range into a spectrum of the object.

4. The spectroscopic measurement apparatus according to claim 3, wherein the first stretching element and the second stretching element are elements having different stretching characteristics.

5. The spectroscopic measurement apparatus according to claim 3, wherein the broadband pulsed light source is a super continuum light source structured to output light continuous over a wavelength width of at least 10 nm in a wavelength region between 900 nm or more and 1300 nm or less.

6. A spectroscopic measurement apparatus comprising:
a broadband pulsed light source;
a dividing element structured to divide broadband pulsed light emitted from the broadband pulsed light source into a long-wavelength pulse and a short-wavelength pulse with a division wavelength as a boundary;
a first stretching element that stretches a pulse width of the long-wavelength pulse so as to generate a first beam such that an elapsed time and the wavelength in a pulse have a one-to-one relationship;
a second stretching element that stretches a pulse width of the short-wavelength pulse so as to generate a second beam such that a relationship between an elapsed time and the wavelength in a pulse is one-to-one;
a first light receiver structured to receive light from an object irradiated with the first beam;
a second light receiver structured to receive light from the object irradiated with the second beam;
a calculator structured to convert a temporal change of an output from the first light receiver and a temporal change of an output from the second light receiver into a spectrum of the object; and
a moving mechanism structured to move the object between a position irradiated with a light beam having a pulse width stretched by the first stretching element and a position irradiated with a light beam having a pulse width stretched by the second stretching element.

7. A spectroscopic measurement method comprising:
an emission step of causing broadband pulsed light to be emitted from a broadband pulsed light source;
a division step of dividing the broadband pulsed light emitted in the emission step into a long-wavelength pulse and a short-wavelength pulse according to wavelength with a division wavelength as a boundary;
a first pulse stretching step of pulse-stretching the long-wavelength pulse so as to generate a first beam, by a first stretching element such that a relationship between an elapsed time and a wavelength in a pulse is one-to-one;
a second pulse stretching step of pulse-stretching the short-wavelength pulse so as to generate a second beam, by a second stretching element such that a relationship between an elapsed time and a wavelength in a pulse is one-to-one;
a first light receiving step of receiving, by a first light receiver having a first sensitivity in a first wavelength range, light from an object irradiated with the first beam;
a second light receiving step of receiving, by a second light receiver having a second sensitivity in a second wavelength range which is different from the first wavelength range, light from the object irradiated with the second beam; and a calculation step of converting a temporal change of an output from the first light receiver received during a time period corresponding to the first wavelength range in the first light receiving step and a temporal change of an output from the second light receiver received during a time period corresponding to the second wavelength range in the second light receiving step into a spectrum of the object.

8. The spectroscopic measurement method according to claim 7, wherein the first stretching element and the second stretching element are elements having different stretching characteristics.

9. The spectroscopic measurement method according to claim 7, wherein the broadband pulsed light is a super continuum light continuous over a wavelength width of at least 10 nm in a wavelength region between 900 nm or more and 1300 nm or less.

* * * * *